United States Patent
Candry et al.

(10) Patent No.: US 9,726,968 B2
(45) Date of Patent: Aug. 8, 2017

(54) DISPLAY SYSTEMS AND METHODS EMPLOYING SCREENS WITH AN ARRAY OF MICRO-LENSES OR MICRO-MIRRORS

(71) Applicant: Barco, Inc., Rancho Cordova, CA (US)

(72) Inventors: Patrick Candry, Kuurne (BE); Bart Maximus, Kuurne (BE); Dirk Maes, Kuurne (BE)

(73) Assignee: Barco, Inc., Rancho Cordova, CA (US)

( * ) Notice: Subject to any disclaimer, the term of this patent is extended or adjusted under 35 U.S.C. 154(b) by 0 days.

(21) Appl. No.: 14/924,023

(22) Filed: Oct. 27, 2015

(65) Prior Publication Data

US 2016/0116834 A1    Apr. 28, 2016

Related U.S. Application Data

(60) Provisional application No. 62/069,095, filed on Oct. 27, 2014.

(51) Int. Cl.
*G03B 21/602* (2014.01)
*G03B 21/604* (2014.01)
(Continued)

(52) U.S. Cl.
CPC ......... *G03B 21/602* (2013.01); *G02B 3/0056* (2013.01); *G02B 3/04* (2013.01);
(Continued)

(58) Field of Classification Search
CPC .... G03B 21/602; G03B 21/604; G03B 35/20; G02B 3/0056; G02B 27/2214; G02B 27/2235
See application file for complete search history.

(56) References Cited

U.S. PATENT DOCUMENTS

| 4,679,069 A | 7/1987 | Andrea et al. |
| 5,137,450 A | 8/1992 | Thomas |

(Continued)

FOREIGN PATENT DOCUMENTS

| CN | 101303456 | 11/2008 |
| CN | 101888565 | 11/2010 |

(Continued)

OTHER PUBLICATIONS

Bolas et al.: "Environmental and Immersive Display Research at the University of Southern California," IEEE VR 2006 Workshop on Emerging Display Technologies, in 4 pages.

(Continued)

*Primary Examiner* — Christopher Mahoney
(74) *Attorney, Agent, or Firm* — Knobbe, Martens, Olson & Bear, LLP

(57) ABSTRACT

An immersive display system is disclosed that includes screens configured to mitigate reduction in contrast ratio due at least in part to peripheral light incident on the screens. The immersive display system includes at least one screen having an array of micro-lenses, a light polarization layer on top of the array of micro-lenses, a polarization rotation layer, a light reflection layer, and a section of non-polarizing light scattering material for individual micro-lenses in the array of micro-lenses. In use, light from a projector associated with the screen is substantially scattered by the non-polarizing light scattering material and light from a projector associated with a different screen in the immersive display system is substantially absorbed by the polarization layer.

20 Claims, 19 Drawing Sheets

(51) Int. Cl.
*G03B 35/20* (2006.01)
*G03B 35/26* (2006.01)
*G02B 27/22* (2006.01)
*G02B 3/04* (2006.01)
*G02B 3/00* (2006.01)
*G03B 37/04* (2006.01)

(52) U.S. Cl.
CPC ..... *G02B 27/2214* (2013.01); *G02B 27/2235* (2013.01); *G03B 21/604* (2013.01); *G03B 35/20* (2013.01); *G03B 35/26* (2013.01); *G03B 37/04* (2013.01)

(56) References Cited

U.S. PATENT DOCUMENTS

| | | |
|---|---|---|
| 5,148,309 A | 9/1992 | Yamada et al. |
| 5,193,015 A | 3/1993 | Shanks |
| 5,528,425 A | 6/1996 | Beaver |
| 5,625,489 A | 4/1997 | Glenn |
| 5,715,083 A | 2/1998 | Takayama |
| 5,964,064 A | 10/1999 | Goddard et al. |
| 6,011,580 A | 1/2000 | Hattori et al. |
| 6,144,491 A | 11/2000 | Orikasa et al. |
| 6,184,934 B1 | 2/2001 | Nishiki |
| 6,381,068 B1 | 4/2002 | Harada et al. |
| 6,924,833 B1 | 8/2005 | McDowall et al. |
| 6,988,803 B2 | 1/2006 | Maximus |
| 7,035,006 B2 | 4/2006 | Umeya et al. |
| 7,347,556 B2 | 3/2008 | Kasik et al. |
| 7,414,831 B1 | 8/2008 | Brown et al. |
| 7,471,352 B2 | 12/2008 | Woodgate et al. |
| 7,679,828 B2 | 3/2010 | Munro |
| 7,931,337 B2 | 4/2011 | Shinozaki et al. |
| 7,931,377 B2* | 4/2011 | Shinozaki ............. G03B 21/26 353/31 |
| 8,149,508 B2 | 4/2012 | Ferren et al. |
| 8,179,424 B2 | 5/2012 | Moller |
| 8,277,055 B2 | 10/2012 | Kuhlman et al. |
| 8,388,138 B1 | 3/2013 | Boothroyd |
| 8,567,953 B2 | 10/2013 | O'Dor et al. |
| 8,692,861 B2 | 4/2014 | Liu et al. |
| 8,714,746 B2 | 5/2014 | Choi et al. |
| 8,780,039 B2 | 7/2014 | Gay et al. |
| 8,786,683 B2 | 7/2014 | Akita |
| 2001/0030804 A1* | 10/2001 | Lambert ............. G03B 21/604 359/449 |
| 2003/0117704 A1 | 6/2003 | Lippey et al. |
| 2005/0068620 A1 | 3/2005 | Umeya |
| 2005/0231800 A1 | 10/2005 | Lippey |
| 2005/0264882 A1 | 12/2005 | Daiku |
| 2006/0056021 A1 | 3/2006 | Yeo et al. |
| 2006/0114171 A1 | 6/2006 | Vascotto et al. |
| 2006/0257586 A1 | 11/2006 | Umeya |
| 2006/0268013 A1 | 11/2006 | Miles |
| 2007/0014318 A1 | 1/2007 | Hajjar et al. |
| 2007/0127121 A1 | 6/2007 | Maximus et al. |
| 2007/0133089 A1 | 6/2007 | Lipton et al. |
| 2008/0080047 A1 | 4/2008 | Field et al. |
| 2009/0246404 A1 | 10/2009 | Greer et al. |
| 2010/0002154 A1 | 1/2010 | Hua |
| 2011/0096136 A1 | 4/2011 | Liu et al. |
| 2011/0157694 A1 | 6/2011 | Ferren et al. |
| 2012/0026157 A1 | 2/2012 | Unkel et al. |
| 2012/0320049 A1 | 12/2012 | Kim et al. |
| 2013/0181901 A1 | 7/2013 | West et al. |
| 2013/0222557 A1 | 8/2013 | Kuo et al. |
| 2013/0286154 A1 | 10/2013 | Wittke et al. |
| 2013/0300637 A1 | 11/2013 | Smits et al. |
| 2013/0308183 A1 | 11/2013 | Vermeirsch et al. |
| 2014/0016041 A1 | 1/2014 | Kim et al. |
| 2014/0016099 A1 | 1/2014 | Choi et al. |
| 2014/0375914 A1 | 12/2014 | Murao et al. |
| 2016/0088270 A1 | 3/2016 | Candry et al. |
| 2016/0088271 A1 | 3/2016 | Candry et al. |
| 2016/0088272 A1 | 3/2016 | Candry et al. |
| 2016/0202478 A1* | 7/2016 | Masson ............. G02B 26/0833 353/30 |

FOREIGN PATENT DOCUMENTS

| | | |
|---|---|---|
| CN | 202939369 | 5/2013 |
| JP | 2000-338449 | 12/2000 |
| JP | 2002-365730 | 12/2002 |
| JP | 2008-175960 | 7/2008 |
| JP | 2009-198699 | 9/2009 |
| JP | 2011-128633 | 6/2011 |
| KR | 100596240 B1 | 7/2006 |
| WO | WO 91/15930 | 10/1991 |
| WO | WO 2004/010681 | 1/2004 |
| WO | WO 2008/091339 | 7/2008 |
| WO | WO 2009/040698 | 4/2009 |
| WO | WO 2011/062822 | 5/2011 |
| WO | WO 2012/040797 | 4/2012 |
| WO | WO 2012/064621 | 5/2012 |
| WO | WO 2013/063235 | 5/2013 |
| WO | WO 2013/095967 | 6/2013 |
| WO | WO 2013/182018 | 12/2013 |
| WO | WO 2015/036501 | 3/2015 |
| WO | WO 2016/014479 | 1/2016 |
| WO | WO 2016/014506 | 1/2016 |
| WO | WO 2016/014560 | 1/2016 |
| WO | WO 2016/069631 | 5/2016 |

OTHER PUBLICATIONS

Eyevis GmbH, Immersive Cube System brochure, Feb. 2009, in 2 pages.
Eon Icube, website printout, available at http://www.eonreality.com/eon-icube/; retrieved Dec. 7, 2015 in 7 pages.
Gross et al.: "blue-c: A Spatially Immersive Display and 3D Video Portel for Telepresence," ACM Transactions on Graphics (TOG)—Proceedings of ACM SIGGRAPH 2003 TOG, vol. 22, Issue 3, Jul. 2003, ACM New York, NY, USA, pp. 819-827.
PCT Search Report and Written opinion for PCT/US15/057631 mailed Feb. 2, 2016 in 12 pages.

* cited by examiner

DISPLAY SYSTEMS AND METHODS EMPLOYING SCREENS WITH AN ARRAY OF MICRO-LENSES OR MICRO-MIRRORS

CROSS-REFERENCE TO RELATED APPLICATIONS

This application claims the benefit of priority to U.S. Prov. App'n No. 62/069,095, filed Oct. 27, 2014, entitled "Display Systems and Methods Employing Screens with an Array of Micro-Lenses or Micro-Mirrors," which is incorporated by reference herein in its entirety.

BACKGROUND

Field

The present disclosure generally relates to projection display systems and methods having one or more projection displays arranged for immersive viewing of an image and includes systems and methods to enhance at least the dynamic range and the contrast ratio of the image based at least in part on selective incident angle reflection of one or more projection screens.

Description of Related Art

Digital cinema servers and projectors receive digital content for projection in a theater or other venue. The content can be packaged in one or more digital files for delivery and storage on a media server. The media server can then extract the digital content from the one or more digital files for display using one or more projectors. In some cases, the content can be 3D video projected onto a screen where slightly different visual content is projected for simultaneous observation in the right and left eyes of a viewer to create the illusion of depth. A multi-projection system can be used to display video on a plurality of screens in a venue, such as in a theater or auditorium, to facilitate an immersive experience for the viewer.

SUMMARY

Example embodiments described herein have innovative features, no single one of which is indispensable or solely responsible for their desirable attributes. Without limiting the scope of the claims, some of the advantageous features will now be summarized.

An immersive display system can include a plurality of projection systems arranged to provide immersive viewing of video. Such an immersive display system can include a plurality of projector systems that each projects video content configured to complement one another to provide an immersive viewing experience for viewers. Each projector system can be configured to project its video onto a projection surface placed around an audience. In this way, the audience can experience a sense of immersion into the environment depicted in the video. Video provided by the plurality of projector systems may be projected on the plurality of projection surfaces creating a unified video presentation. Such immersive display systems are capable of generating audiovisual presentations with a relatively high level of realism due at least in part to the quality of the images provided on the plurality of projection surfaces.

However, having multiple projection surfaces can result in light being reflected from a first projection surface to a second projection surface and then to the viewer. This light mixes with the light reflected directly from the first projection surface to the viewer. Such mixing of light on the plurality of projection surfaces can reduce the contrast ratio and/or dynamic range of the projection surfaces, thereby diminishing the quality of the images provided in the immersive display system. This mixing of light can be referred to as cross-talk or cross-reflection and can be a challenge in immersive display systems. This challenge may be even more difficult to overcome for immersive display systems designed for a relatively large group of people, such as in a movie theater, due at least in part to the wide range of viewing angles of the viewers in the audience.

Accordingly, systems and methods are provided herein for immersive display systems that include a plurality of projection surfaces (e.g., screens) that are usable over a wide range of viewing angles and for which a decrease in the contrast ratio and/or dynamic range caused by cross-talk or cross-reflection between different parts of the plurality of projection surfaces is substantially reduced. In some embodiments, the systems and methods disclosed herein provide relatively high-contrast, high-dynamic range immersive viewing of images using two or more curved or plane screens where the cross-reflections are substantially suppressed by selectively scattering and absorbing light through a multi-layer structure that scatters light incident within a tailored range of incident angles and that absorbs light incident outside the tailored range of incident angles. This can be accomplished through a combination of light polarization layers, polarization rotation layers, reflection layers or structures, and non-polarizing light scattering materials in combination with arrays of micro-lenses and/or micro-mirrors.

In a first aspect, a screen is provided for use in an immersive display system, the screen including an array of micro-lenses, individual lenses in the array of micro-lenses having a width D, a layer of light polarization material, a polarization rotation layer, a light reflection layer, and a section of non-polarizing light scattering material for individual micro-lenses in the array of micro-lenses. The section of non-polarizing light scattering material has a width that is less than the width D. In use, light from a projector associated with the screen is substantially scattered by the non-polarizing light scattering material and light from a projector associated with a different screen in the immersive display system is substantially absorbed by the polarization layer.

In some embodiments of the first aspect, the array of micro-lenses comprises spherical micro-lenses. In a further embodiment, the array of micro-lenses further comprises aspherical micro-lenses.

In some embodiments of the first aspect, the array of micro-lenses comprises cylindrical micro-lenses. In a further embodiment, the array of micro-lenses further comprises cylindrical micro-lenses having an aspheric shape in a plane perpendicular to a longitudinal axis of the cylindrical micro-lens. In a further embodiment, each section of non-polarizing light scattering material forms a strip parallel to a longitudinal axis of the associated cylindrical micro-lens.

In some embodiments of the first aspect, the screen further includes perforations positioned at transitions between micro-lenses in the array of micro-lenses. In a further embodiment, the perforations in the array of perforations are located at corners between spherical micro-lenses. In a further embodiment, the perforations in the array of perforations are located at edges between cylindrical micro-lenses. In a further embodiment, the perforations in the array of perforations are equidistant along a straight line. In a further embodiment, the perforations in the array of perforations are circular.

In a second aspect, a screen is provided for use in an immersive display system. The screen includes an array of micro-mirrors, individual mirrors in the array of micro-mirrors having a width D, a polarization rotation layer, a linear polarization layer, and a section of non-polarizing light scattering material for individual micro-mirrors in the array of micro-mirrors. The section of non-polarizing light scattering material has a width that is less than the width D. In use, light from a projector associated with the screen is substantially scattered by the non-polarizing light scattering material and light from a projector associated with a different screen in the immersive display system is substantially absorbed by the polarization layer.

In some embodiments of the second aspect, the array of micro-mirrors comprises spherical micro-mirrors. In a further embodiment, the array of micro-mirrors further comprises aspherical micro-mirrors.

In some embodiments of the second aspect, the array of micro-mirrors comprises cylindrical micro-mirrors. In a further embodiment, each section of non-polarizing light scattering material forms a strip parallel to a longitudinal axis of the associated cylindrical micro-mirror. In some embodiments of the second aspect, the screen further includes perforations positioned at transitions between micro-mirrors in the array of micro-mirrors.

In a third aspect, an immersive display system is provided that includes one or more of the screens of the first or second aspect. In some embodiments of the third aspect, the one or more screens are curved.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements.

DETAILED DESCRIPTION

Figure 1A:
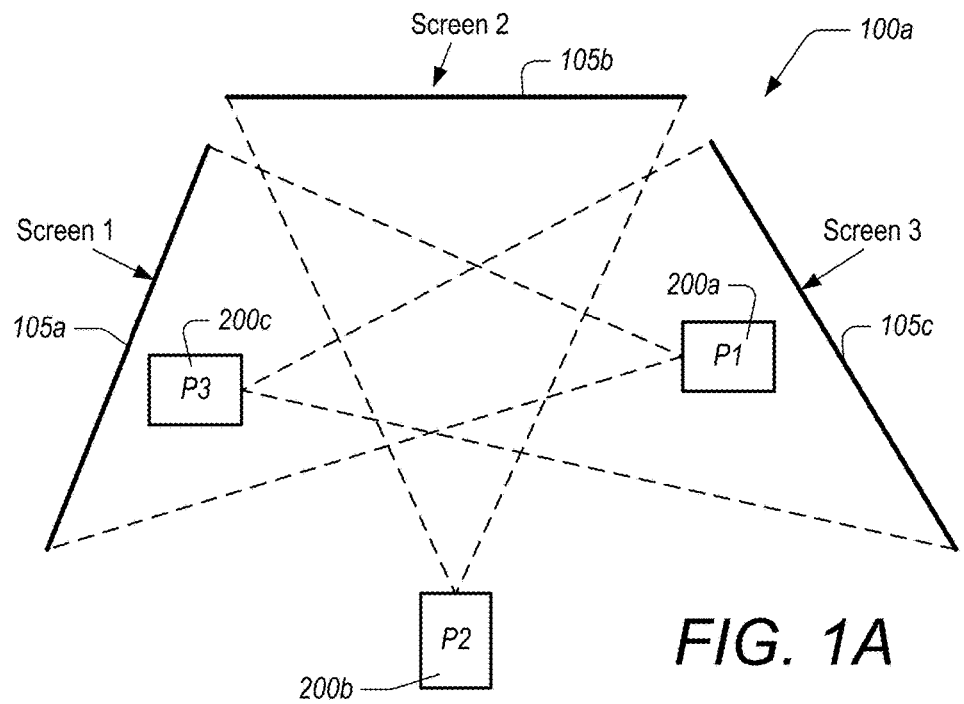
FIGS. 1A and 1B illustrate example immersive display systems for providing an immersive display experience.

Although certain embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described below. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Immersive display systems are capable of generating images with a high level of realism because the images are simultaneously presented to the viewer in many directions. Typical immersive display systems may suffer from a low contrast ratio and a low dynamic range due at least in part to cross-talk or cross-reflection. As used herein, cross-talk and/or cross-reflection refers generally to the situation where light emitted from one part of a screen of an immersive display system is incident on other parts of the screen of the immersive display system and these emitted rays are then partially reflected back to one or more viewers after diffuse reflection. This cross-talk or cross-reflection may arise in typical immersive display systems due at least in part to the screens reflecting substantially all of the light incident thereon. Generally, peripheral light, e.g., light that is not related with the local image projected on the screen or provided by the display, that is incident on a display-screen and that is not absorbed by the display-screen is superimposed on the displayed image resulting in reduced image contrast. Peripheral light or illumination can strongly deteriorate the contrast ratio of the image. Similarly, peripheral light can deteriorate the color saturation of the image and, consequently, the dynamic range of the image. Therefore, it is desirable and advantageous to reduce or minimize reflection of peripheral light in general, and in particular to reduce or minimize cross-talk.

Accordingly, disclosed herein are systems and methods to improve the rejection of peripheral light on front projection screens to thereby enhance the contrast of images generated by front projection. In particular, disclosed herein are time multiplexed screens and projector systems for use in immersive display systems, the screens and projector systems of an immersive display system being time multiplexed to reduce or minimize the effects of cross-talk on projected images.

The systems and methods provided herein are configured to improve contrast ratio and/or dynamic range for immersive display systems having a plurality of projection surfaces with a plurality of projector systems. There may be a number of systems and methods for improving contrast ratio and/or dynamic range that may be combined with the disclosed systems and methods to achieve one or more specific advantages. In some implementations, these systems and methods may have certain shortcomings that the disclosed systems and methods overcome, either on their own or in combination with other systems and methods. For example, a method to improve contrast of an immersive dome theater concentrates the brightness of the image within a central field-of-view of viewers that are unidirectionally seated in the theater. However, this may disadvantageously sacrifice brightness toward the outside edges of the viewer's field-of-view. Another method to improve contrast includes coating the screen with a visually-reflective coating that provides a textured surface and that acts as a micro-baffle to suppress cross-reflection of projected imagery. Another method to improve contrast of a curved, back-projection screen or immersive display includes using a specific tailored or optimized rear-screen coating.

The contrast of a front projection screen can be improved through the use of metal flakes and light absorbing particles distributed in a host material. Similarly, a reflection-type projection screen may include a light-reflecting layer and a transparent light-diffusing layer, the light-reflecting layer comprising a transparent resin with flakes of a light-reflective material dispersed therein and the transparent light-diffusing layer comprising a transparent resin with fine crystalline particles of calcite and achromatic dyes or pigments dispersed therein. Such screens can improve luminance and image contrast while substantially maintaining the same angle of diffusion or without substantially decreasing the angle of diffusion.

Contrast for a front-projection screen can be improved by selective reflection of light in the wavelength range of the image display light and by absorbing ambient light. For example, a screen for use in a front-projection system can include a section configured to reflect light of targeted wavelengths or targeted wavelength ranges, where the reflection is greater than non-targeted wavelengths or non-targeted wavelength ranges. Such a screen can enhance contrast between incident projected light and ambient light. As another example, a selective-reflecting projection screen can include a structure configured to selectively reflect incident optical energy of a number of relatively narrow bands of optical wavelength ranges and to absorb light with wavelengths falling between and/or outside the narrow bands. The projection screen can include a micro-lens structure that focuses incoming light so that when the light is reflected from the screen, it passes through a relatively small spot having high diffusion or beam spreading.

Rejection of ambient light can be improved in a projection screen by configuring the screen to have different reflectivities for different angles of incidence and/or polarizations. For example, ambient light rejection can be improved by configuring a screen to have relatively high reflectivity for light with a relatively low angle of incidence and a polarization parallel to that of the projector, relatively low reflectivity for light with a relatively high angle of incidence and a polarization parallel to that of the projector, and relatively low reflectivity for light with a polarization perpendicular to that of the projector (having either a low or high angle of incidence). A reflective front projection screen can be configured to project an image with enhanced contrast and relatively wide viewing angle in the presence of relatively high levels of ambient light by including a reflective polarizing element in combination with a diffusing element and/or a glare-suppression element. A projection screen can comprise a cholesteric liquid crystalline, polarized-light selective reflection layer to selectively and diffusely reflect a targeted or known polarized-light component. A front projection screen may also be overlaid with a polarized sheet.

A high contrast front projection screen can include a plurality of micro-elements that include surfaces configured to change from a low-reflectivity state to a high-reflectivity state by switching on and off appropriate structures arranged on a substrate (e.g., an active screen). The surface of the micro-elements are in a low-reflectivity state for black segments of a projected image or video and are in a high-reflectivity state for segments that are outside of the black segments of the projected image or video.

A front projection screen can include a lenticular lens sheet overlaying a polarization rotation plate, the polarization plate overlaying a reflective surface, and a polarizing film overlaying the lenticular lens sheet. The polarizing film can include non-polarizing segments at the focal point of each lenticular lens so that light from the projector is relatively un-attenuated by the polarizing film while light from other sources is attenuated. Light from the projector is generally distributed with an aspect ratio of viewing angle equal to that of the lenses in the lenticular lens sheet.

A front projection screen can be overlaid with a plastic sheet filled with polymer-dispersed liquid crystals and having a transparent electrode on both sides of the plastic sheet. The plastic sheet is transparent in a first state and can be turned to white by applying a voltage across the plastic sheet. The plastic sheet can be coated black on a one side so that when no voltage is applied to the electrodes, the screen is black due at least in part to reflected light from the back side of the transparent plastic sheet. When voltage is applied to the electrodes, the screen can turn white during the time that the voltage is applied. The screen can receive pulses of voltage that are synchronized with a pulsing of a projector. In such a scenario, the screen can be configured to be white or to have a relatively high reflectivity during the time that the projector is active, and to be black or to have a relatively low reflectivity when the projector is inactive.

Some screens can have a visually-reflective layer applied to an inner surface of open-cell foam. The reflective coating can be applied sufficiently thin to not fill and/or block the open-cell foam structure. The reflective coating can coat the inside of the open cells. This can yield a projection surface that reflects most light at near-normal incidence angles, and trap in the open cell light from more oblique incident angels, thereby reducing cross-reflections. The resulting screen includes a micro-baffled screen surface with a relatively high degree of directionality and with a relatively rapid angular cut-off. However, this design may be undesirable and/or disadvantageous in an immersive display system where a wide range of viewing angles with the same or almost the same luminance is desired or preferable. This may also be undesirable and/or disadvantageous in an immersive display system where a smooth and gradual decrease in luminance as a function of viewing angle is desired or preferable.

The above systems and methods can be used to enhance the contrast of immersive display systems by reducing cross-reflection, but may suffer from some disadvantages that are overcome by the systems and methods described herein. In particular, some embodiments disclosed herein provide for an immersive display system that suppresses cross-reflection and that has a targeted or desired luminance as a function of viewing angle (e.g., a smooth and gradual decrease in luminance as a function of viewing angle).

Some of the above-described screen designs assume that viewers use the same or similar central field-of-view. This may be disadvantageous because it restricts the use of the immersive display system. Some of the above-described issues may be addressed by the systems and methods disclosed herein. In particular, an immersive display system is described that suppresses cross-reflection while providing a substantial improvement to contrast where viewing directions are allowed to expand beyond a common central field-of-view. Such an immersive display system can be used in more situations and configurations because it provides an improved viewing experience for a larger audience.

Some of the above-described systems and methods configured to enhance contrast for front-projection systems are aimed at rejecting ambient light for use with individual front projectors. Such systems and methods may not be effective for suppressing cross-reflection and improving contrast for ensembles of projectors configured to project images on multiple front and/or rear projection screens. In such immersive display systems with multiple projectors and/or screens, the relative screen orientations and optical screen characteristics may produce cross-reflections which reduce contrast and/or color saturation of projected images. Accordingly, one or more of the embodiments disclosed herein include an immersive display system that effectively suppresses cross-reflection.

In certain implementations, cross-reflection can be suppressed by angle-selective absorption of a front projection screen. For example, the front projection screen can have preferential directions for light reflection, while light from other directions can be preferentially or substantially absorbed. The preferential directions for light reflection can correspond with directions of light rays from one or more projectors intended to show images on the targeted front projection screen, while the light from other directions emerges from projectors that are not intended to show images on the targeted front projection screen.

The preferential directions for light reflection can be based at least in part on the location of non-polarizing light scattering sections located on top of spherical and/or aspheric micro-lenses or in front of spherical and/or aspheric micro-mirrors. Screens utilizing cylindrical micro-lenses and/or cylindrical micro-mirrors can also be included. In some implementations using cylindrical micro-lenses and/or micro-mirrors, the preferred directions for light reflection can be based at least in part on the location of non-polarizing light scattering strips on top of the cylindrical micro-lenses and/or in front of the cylindrical micro-mirrors.

The light scattering properties of the screen can be configured to be independent of the geometry of the micro-lenses and/or the micro-mirrors and the scattering can be made symmetrical or asymmetrical.

Provided herein are also configurations to address challenges with acoustics in immersive display systems. For example, arrangements are disclosed for perforations in screens that are configured to maintain the optical qualities of the screens (e.g., perforations can be included without causing a significant or substantial degradation in the optical characteristics of the screen).

Immersive Display System

Figure 1B:
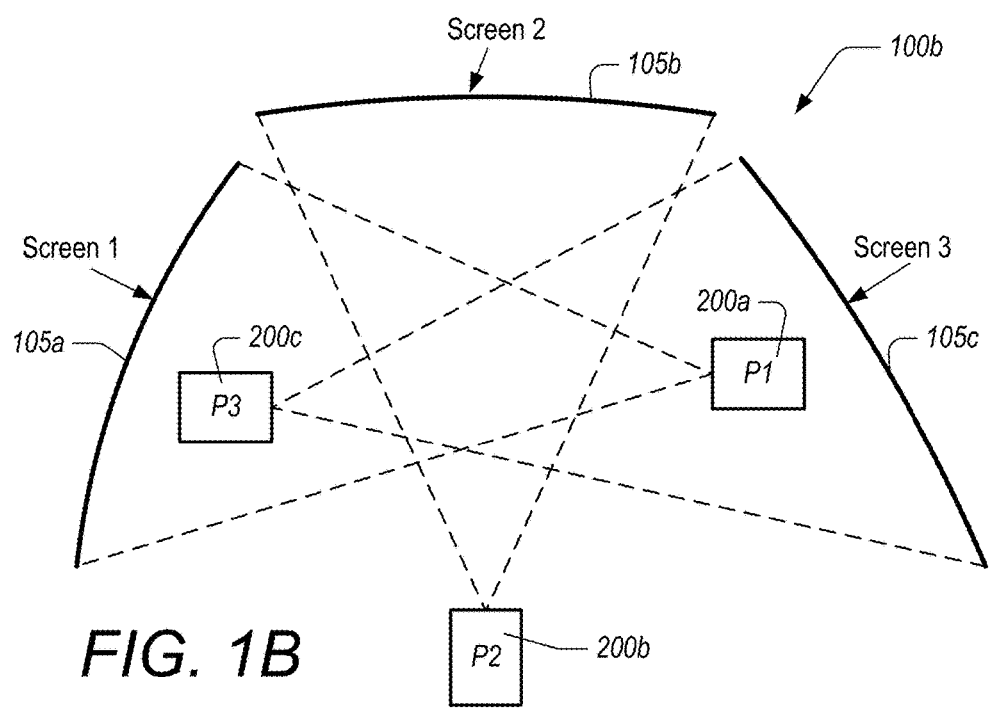

FIGS. 1A and 1B illustrate example immersive display systems 100a, 100b comprising a plurality of projectors 200a, 200b, 200c configured to project images onto corresponding screens 105a, 105b, 105c for providing an immersive display experience. The screens 105a-105c can be planar front-projection displays, as illustrated in FIG. 1A, or curved front-projection displays, as illustrated in FIG. 1B. There can be gaps between adjacent displays. For example, screens 105a-c can have gaps between them as depicted in FIGS. 1A and 1B. In some embodiments, the gaps can be relatively small, close to zero, or zero. The immersive display systems 100a, 100b can include a plurality of flat or curved displays or screens or it can include a single curved display or screen. The screens can be rotated relative to one another. The screens 105a-c can also have respective inclinations relative to one another. The screens 105a-c of the immersive display systems 100a, 100b can include flat screens, curved screens, or a combination of both.

The example immersive display systems 100a, 100b includes three front-projection screens 105a-c wherein the image on each screen is provided by a projector system. Projector system 200a is configured to project video onto screen 105a, projector system 200b is configured to project video onto screen 105b, and projector system 200c is configured to project video onto screen 105c. Sound systems may be mounted behind screen 105a, screen 105b and/or screen 105c. The light emitted by the projector systems P1, P2 and P3 can have desired or selected polarization states or can be randomly polarized.

In some embodiments, the screens 105a-c can be curved screens, an example of which is illustrated in FIG. 1B. The considered curvature can be in the plane of the paper, in a plane perpendicular to the plane of the paper, or in both the plane of the paper and in a plane perpendicular to the paper. This immersive display system 100b, for example, comprises three curved front-projection screens 105a-c, and the image on each screen is projected from one or more projectors. For example, projector system P1 200a can be one or more projectors projecting the image on screen 1 105a, projector system P2 200b can be one or more projectors projecting the image on screen 2 105b, and projector system P3 200c can be one or more projectors projecting the image on screen 3 105c.

Light emerging from the projector systems 200a-c can each have different spectra. This may result in color differences between the images provided by these projector systems. These color differences can be electronically compensated. An example method for compensating color differences between two projectors is disclosed in U.S. Pat. Pub. No. 2007/0127121 to B. Maximus et al., which is incorporated by reference herein in its entirety. The spectra of the projector systems 200a-c can be configured to project, after electronic compensation, color images with a color gamut according to Rec. 709 or DCI P3, for example.

The projector systems 200a-c refer to devices configured to project video on the screens 150a-c. These projector systems 200a-c can include a media server and a projector. In some embodiments, the media server is physically separate from the projector and is communicably coupled (e.g., through wired or wireless connections) to the projector. In some embodiments, the projector system comprises an integrated media server and projector. The media server portion of the projector system can include hardware and software components configured to receive, store, and decode media content. The media server can include hardware and software configured to ingest and decode digital content files, to produce a media stream (e.g., video and audio), to send image data to the projector. The media server can include modules for ingesting digital content, decoding ingested content, generating video from the decoded content, generating audio from the decoded content, providing security credentials to access secure content, and to generate or interpret synchronization signals to provide a synchronized presentation, and the like. The projector can include an optical engine, a modulation element, optics, and the like to enable the projector to produce, modulate, and project an image. For example, the projector may be implemented using a cathode ray tube (CRT), a liquid crystal display (LCD), digital light processing (DLP), digital micro-mirror devices (DMD), etc.

The projector systems 200a-c can be configured to provide video with an aspect ratio and resolution conforming to any of a number of standards including, for example and without limitation, 4K (e.g., 3636×2664, 3996×2160, 3840×2160, 4096×2160, etc.), 2K (e.g., 1828×1332, 1998×1080), HD (e.g., 1920×1080, 1280×720), or the like. The projector systems 200a-c can be configured to provide video with a variety of frame rates including, for example and without limitation, 24 fps, 30 fps, 60 fps, 120 fps, etc. The projector systems 200a-c can be configured to display synchronized 3D content (e.g., stereoscopic video) on two or more screens.

As an example, the immersive display systems 100a, 100b can include DCI-compliant projector systems 200a-c configured to play DCI-compliant content inside a movie theater. The DCI-compliant content can include a media stream (e.g., video data or video and audio data extracted from digital content). In some implementations, the media stream is provided as a digital cinema package ("DCP") comprising compressed, encrypted, and packaged data for distribution to movie theaters, for example. The data can include a digital cinema distribution master ("DCDM") comprising the image structure, audio structure, subtitle structure, and the like mapped to data file formats. The data can include picture essence files and audio essence files that make up the audiovisual presentation in the DCP. The DCP can include a composition which includes all of the essence and metadata required for a single digital presentation of a feature, trailer, advertisement, logo, or the like. The projector systems 200a-c can be configured to ingest the DCP and generate a visually indistinguishable copy of the DCDM and then use that copy of the DCDM to generate image and sound for presentation to an audience.

FIGS. 1A and 1B illustrate three projector systems 200a-c and three screens 105a-c. However, the immersive display system can include a different number of projector systems and/or screens. For example, the immersive display systems 100a, 100b can include 2, 3, 4, 5, 6, 7, 8, 9, 10, or more than 10 projector systems. The immersive display systems 100a, 100b can include 2, 3, 4, 5, 6, 7, 8, 9, 10, or more than 10 screens. The immersive display systems 100a, 100b can be configured such that more than one projector system provides video on a single screen, such that the images substantially overlap. The immersive display systems 100a, 100b can be configured such that projector systems provide video on a single screen wherein the videos from projector systems minimally overlap, are adjacent to one another, or are near one another to provide a substantially unitary video presentation.

The sound in an immersive display system can be important, and may be of comparable importance to the visual information. Typical immersive display systems may experience problems with audio or acoustics based at least in part on the viewing surface acting as an acoustic reflector. This can result in undesirable and/or unwanted echoes and reverberations of sounds within the immersive environment. In some implementations, the immersive display systems 100a, 100b include perforated display screens 105a, 105b, and/or 105c to reduce this problem. Perforated display screens can be configured to allow sound within the immersive environment to escape the environment and to allow sound from speakers behind the screens to enter the immersive environment. This can reduce or eliminate unwanted or undesirable echoes and reverberations while increasing the desired sound within the immersive environment.

Sound systems may be mounted behind the front projection screen 1 105a, screen 2 105b and/or screen 3 105c. To reduce attenuation of high frequency sound waves, arrays of perforations (e.g. circular holes) may be used. The perforation in a screen may be laid out so that the centers of the holes are equidistant in, for example and without limitation, a staggered or straight hole arrangement. The number of equidistant circular holes per unit area, the hole diameter, and/or the screen thickness are parameters that can be tuned to achieve acceptable or suitable transmission loss at frequencies larger than about 1 kHz. Examples of perforated screens are described in greater detail herein with reference to FIGS. 13A-14B.

Example Immersive Display System Screens

Figure 2A:
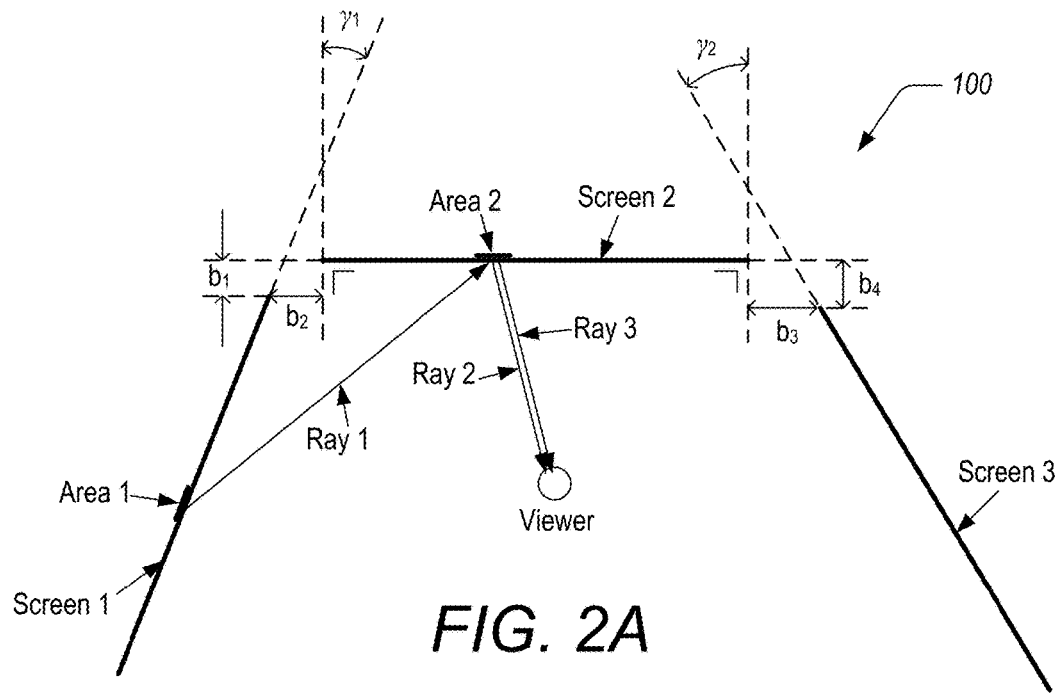
FIGS. 2A and 2B illustrate examples of immersive display systems comprising three screens, and illustrate examples of cross-talk in such immersive display systems.
Figure 2B:
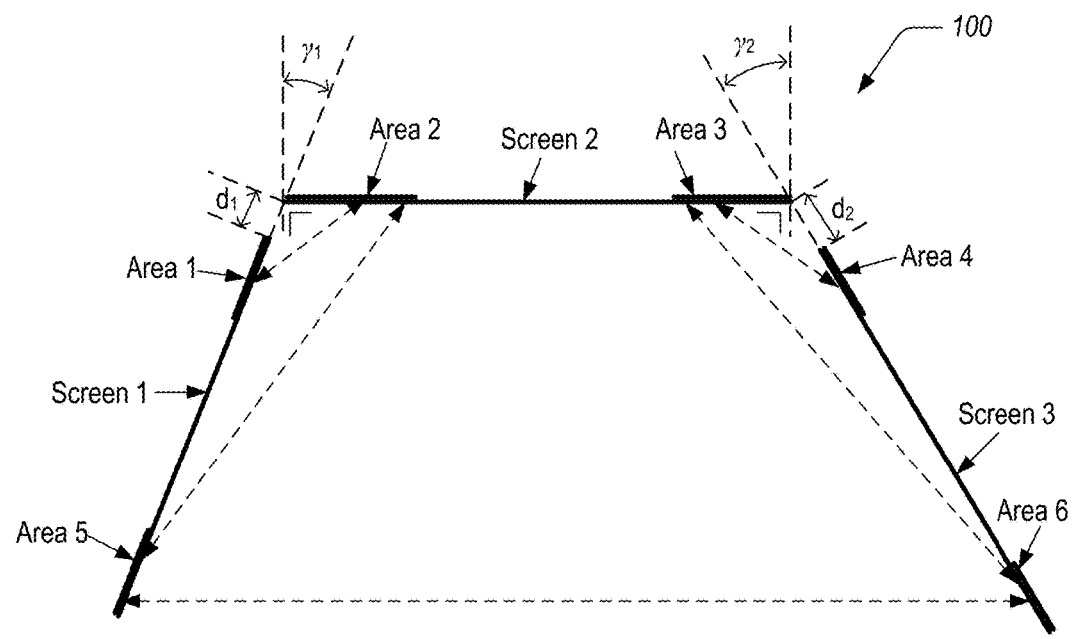

FIGS. 2A and 2B illustrate examples of immersive display systems 100 comprising three screens, and illustrate examples of cross-talk in such immersive display systems. An immersive display system 100 can include a plurality of screens. The screens can be arranged such that there are gaps between adjacent displays. For example, the immersive display system 100 illustrated in FIG. 2A can have gaps $b_1$, $b_2$, $b_3$, and $b_4$, and the immersive display system 100 illustrated in FIG. 2B can have gaps $d_1$ and $d_2$. In some embodiments, the gaps can be relatively small, close to zero, or zero. The screens can have a relative orientation characterized, for example, by angles $\gamma_1$ and $\gamma_2$. Screens 1, 2 and 3 can also have respective inclinations corresponding to angles $\gamma_3$, $\gamma_4$, and $\gamma_5$, where the angles are measured with respect to a direction perpendicular to the plane of the paper.

With reference to FIG. 2A, Ray 1 represents reflected light from an image projected onto Screen 1, Ray 1 reflected from Area 1 and incident on Area 2 of Screen 2. Ray 3 represents reflected light from an image projected onto Screen 2 at Area 2 that reaches a viewer. Ray 2 represents reflected light from Ray 1 at Area 2 on Screen 2. In the absence of Ray 1, Ray 3 is reflected by Screen 2 to the viewer, Ray 3 being part of the original image. Where there is cross-talk from Area 1 onto Area 2, however, Ray 2 is also perceived by the viewer. The mixture of Ray 2 and Ray 3 is referred to as cross-talk and can substantially reduce the contrast ratio and the color saturation of the original images, consequently reducing the dynamic range of the original images.

FIG. 2B illustrates another example of cross-talk, where intensity can depend on a distance between areas that are mutually illuminated. For example, the immersive display system 100 includes multiple adjacent or almost adjacent screens, the cross-talk may be pronounced on the parts of the screens that can illuminate each other from a relatively short distance and for screen-configurations where the angle between the screens is relatively small. As the distance between the considered screen areas increases, the illuminance caused by the cross-talk decreases (e.g., approximated by an inverse square law), and when the angle between the screens increases the illuminance also decreases (e.g., approximated by the cosine law of illumination). For example, for the immersive display system 100, the cross-talk between Area 1 and Area 2 or between Area 3 and Area 4 will be more intense than between Area 2 and Area 5, between Area 3 and Area 6, or between Area 5 and Area 6. This cross-talk phenomenon may be particularly pronounced when the radiation pattern of the reflected light has a broad angular distribution, e.g., such as for a Lambertian or quasi-Lambertian reflecting screen. In some instances, this cross-talk phenomenon may be less pronounced when the radiation pattern of the reflected light is relatively directional, e.g., such as for a high-gain screen. In some embodiments disclosed herein, a wide viewing angle may be preferable and thus the radiation pattern of the reflected light typically has a broad angular distribution. In such embodiments, the reduction or elimination of cross-talk may be particularly advantageous.

To illustrate the effect of cross-talk on contrast ratio, a simple example will be provided. Contrast ratio is related to the quality of a display system. The full-on/full-off contrast ratio (e.g., sequential contrast ratio) can be defined as a ratio of maximum luminance to minimum luminance. Maximum luminance, $L_{max}$, can be a luminance value output by a display that is driven with a 100% white signal, and minimum luminance, $L_{min}$, can be a luminance value output by a display that is driven with a 0% white level (e.g., a black level).

$$C_{on\,off} = \frac{L_{max}}{L_{min}}$$

The measured luminance in general depends on the observation angle and the contrast ratio is generally a function of the observation angle. Where there is peripheral illumination incident on the screen of the display, it may be partially reflected towards the viewer and added to the luminance from the display. With a non-zero peripheral illumination, the full-on/full-off contrast ratio is:

$$C_{on\,off} = \frac{L_{max} + L_a}{L_{min} + L_a}$$

where $L_a$ corresponds to the peripheral illumination and the reflection characteristics of the display screen.

Another method to characterize the contrast ratio of a display is sometimes referred to as the 'checkerboard method,' and is prescribed in ANSI 1992, IEC 2001 In this method, a 4×4 checkerboard pattern of black and white rectangles that covers the complete image area of the display is used. The luminance at the center of each rectangle is measured. The eight white values are averaged, $\langle L_{cb,max} \rangle$, and the eight black values are averaged, $\langle L_{cb,min} \rangle$. The contrast, sometimes referred to as ANSI contrast ratio, is then:

$$C_{ANSI} = \frac{\langle L_{cb,max} \rangle}{\langle L_{cb,min} \rangle}$$

The ANSI contrast ratio can generally depend on the observation angle; and, if the peripheral illumination is non-zero, that non-zero illumination may also influence the measured ANSI contrast ratio:

$$C_{ANSI} = \frac{\langle L_{cb,max} \rangle + L_a}{\langle L_{cb,min} \rangle + L_a}$$

Values for projection displays are provided to give some example values for contrast ratios (e.g., $C_{on\,off}$ and $C_{ANSI}$). As demonstrated by these values, the contrast ratio can greatly reduce where there is peripheral illumination. A first example projection display has a maximum luminance, measured in a direction orthogonal to the screen, of 500 cd/m$^2$ and a minimum luminance of 0.25 cd/m$^2$, giving a full-on/full-off contrast ratio of 2000:1 when the peripheral light is zero. If, instead, there is incident peripheral light that is reflected to the observer and that reflected peripheral light adds 5 cd/m$^2$, then the full-on/full-off contrast ratio is reduced to ~96:1. For a typical projection display, the ANSI contrast ratio is lower than the full-on/full-off contrast ratio and can be, for example, ~200:1. For the same reflection of the peripheral light described in this paragraph, the ANSI contrast ratio is reduced to ~67:1.

Example Screens with Spherical and/or Aspheric Micro-Lenses

Figure 3A:
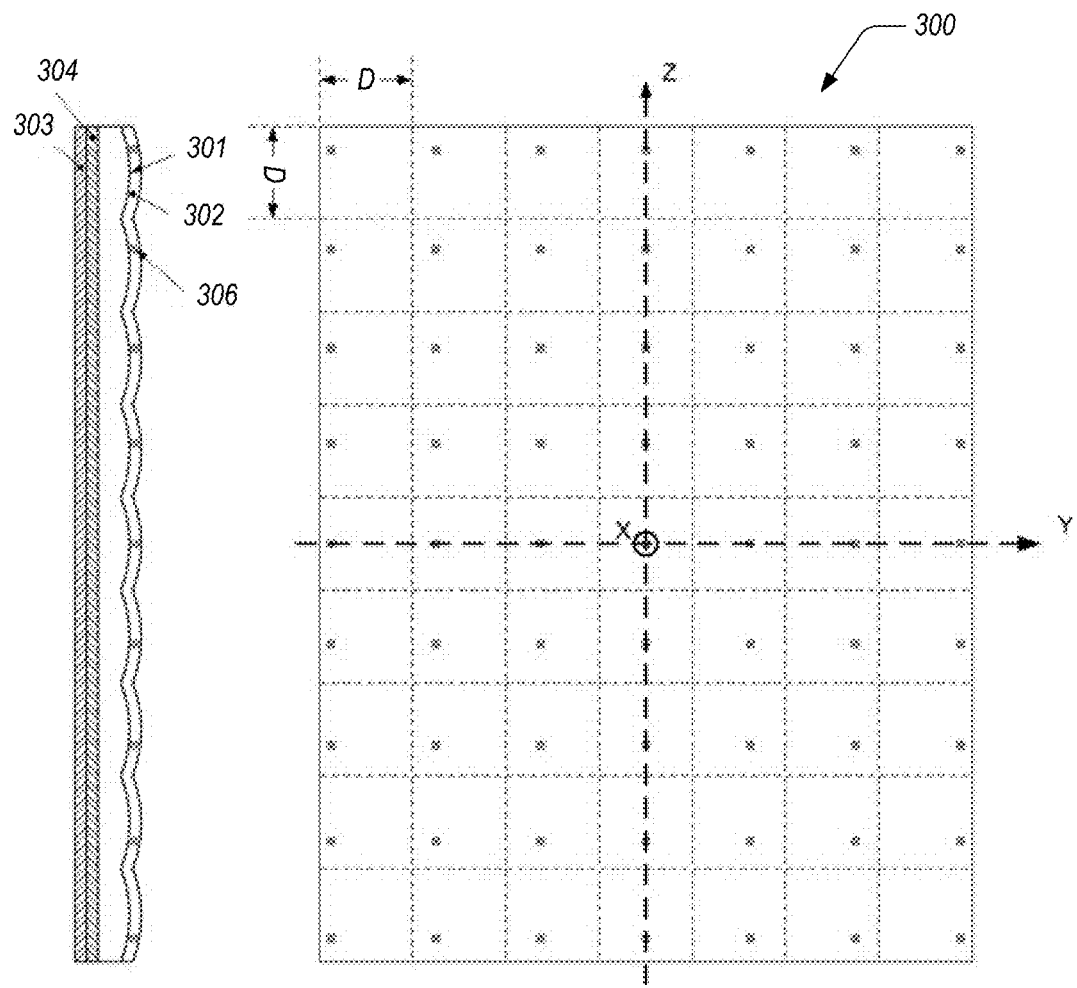
FIG. 3A illustrates a cross-section view and a front view of a front projection screen with an array of spherical micro-lenses for a projection set up with the optical axis substantially coinciding with the x-axis.

FIG. 3A illustrates a cross-section view and a front view of a front projection screen 300 with an array of micro-lenses 301 for a projection set up with the optical axis substantially coinciding with the x-axis. The front projection screen 300 has a multi-layer structure that includes a sheet with, for example and without limitation, the array of planoconvex micro-lenses 301 and a layer of light polarization material 302 on top of this array. The back side of the sheet of plano-convex micro-lenses 301 includes a polarization rotation layer 304 followed by a light reflection layer 303. Individual micro-lenses have a radius, R, refractive index, n, and can have, for example and without limitation, a square shape with sides of length D. The layer of light polarizing material 302 on top of the micro-lenses 301 can have a relatively small section of non-polarizing light scattering material 306 for individual micro-lenses. The location of this non-polarizing light scattering section 306 can depend at least in part on the location of the micro-lens in the array of micro-lenses 301. The location of this non-polarizing light scattering section 306 can depend at least in part on the projector set-up, examples of which are described in greater detail herein.

Figure 3B:
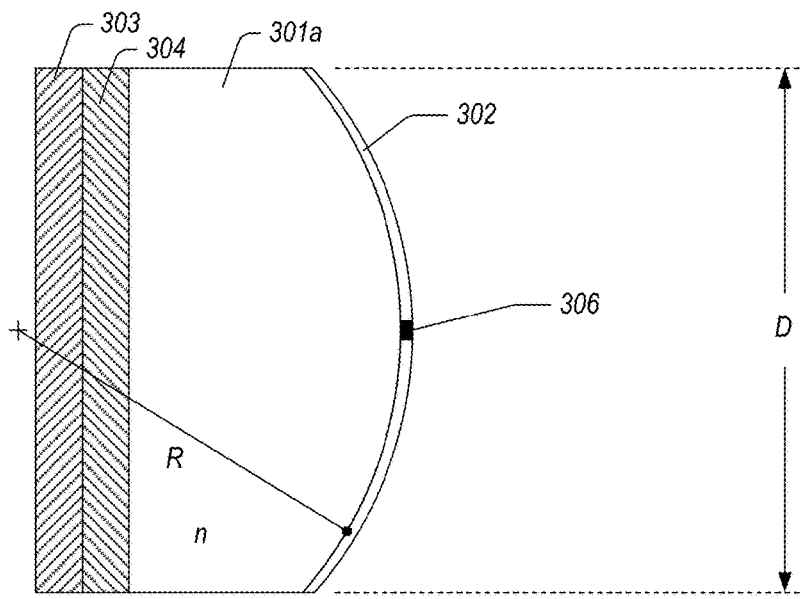
FIGS. 3B and 3C illustrate a cross-section view of a single spherical micro-lens with polarization layer having a section of non-polarizing light scattering material, polarization rotating layer, and light-reflection layer.

FIG. 3B illustrates a cross-section view of a single micro-lens 301a with polarization layer 302 having a section of non-polarizing light scattering material 306, polarization rotating layer 304, and light-reflection layer 303. The micro-lens 301a with radius R has a focal point F located at a distance, f, from the top of the micro-lens 301a. The location of the focal point F depends at least in part on the radius, R, and the refractive index, n, of the material of the micro-lens 301b. This material can be, for example and without limitation, PMMA (Polymethyl methacrylate) with a refractive index of about n=1.4914. A bundle of random polarized parallel light rays 305 with, for example and without limitation, an incident angle α=0, can be linearly polarized by the polarization layer 302 and refracted in the direction of the focal point F. When the light rays reach the light reflection layer 303, they can be reflected back. The polarization direction of the linear polarized light rays can be rotated over 90° by traveling twice through the polarization rotation layer 304. The distance between the top of the micro-lens 301b and the light reflection layer is about f/2, which can focus the rays at the point A. Around this point A there can be a section of non-polarizing light scattering material 306, and the light rays that reach point A can propagate through the section of non-polarizing light scattering material 306 and can be scattered in the direction of the viewers.

Figure 3C:
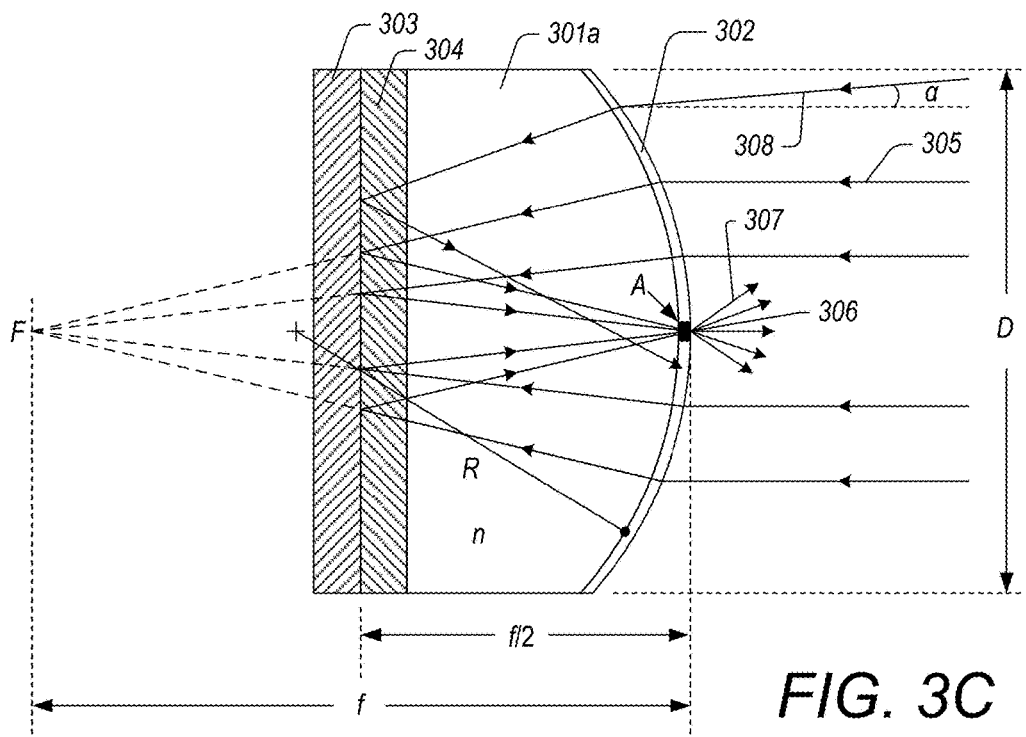

FIG. 3C illustrates a bundle of light rays 307 that represent the scattered light rays. The parallel light bundle 305 can be focused by the micro-lens 301b at the top of the lens 301b (e.g., at point A) and other light rays (e.g., light ray 308) that are not parallel can be absorbed by the light polarizing layer 302. The scattering characteristics of the scattered light rays 307 can be symmetrical or asymmetrical and can be adapted to the needs of the application, independent of other optical characteristics of this optical construction. In some implementations, these linear polarized light rays can be substantially blocked at the light polarizing layer 302 and may not be substantially or significantly affected by this polarization layer 302.

Random polarized incident light rays under an angle α>0 (e.g., ray 8 of FIG. 3C) can hit again the linear polarizer 302 after polarization by the polarization layer 302, refraction by the micro-lens 301a, reflection by the light reflection layer 303, and polarization rotation over 90° by layer 304. Due at least in part to the polarization state of the light arriving back at the linear polarizer 302 being rotated over 90°, these light rays can be substantially or completely absorbed by the polarization layer 302 because these light rays are not traveling through the non-polarizing light scattering section 306.

The optical construction of the screen 300 can be configured to diffusely reflect light with incident angle α≈0 and to absorb light with incident angles α>0 and/or α<0. The scattering properties are characterized at least in part by the scattering properties of the material in the non-polarizing light scattering section 306 around point A, and can be made independent of other optical properties of this optical construction.

Figure 4:
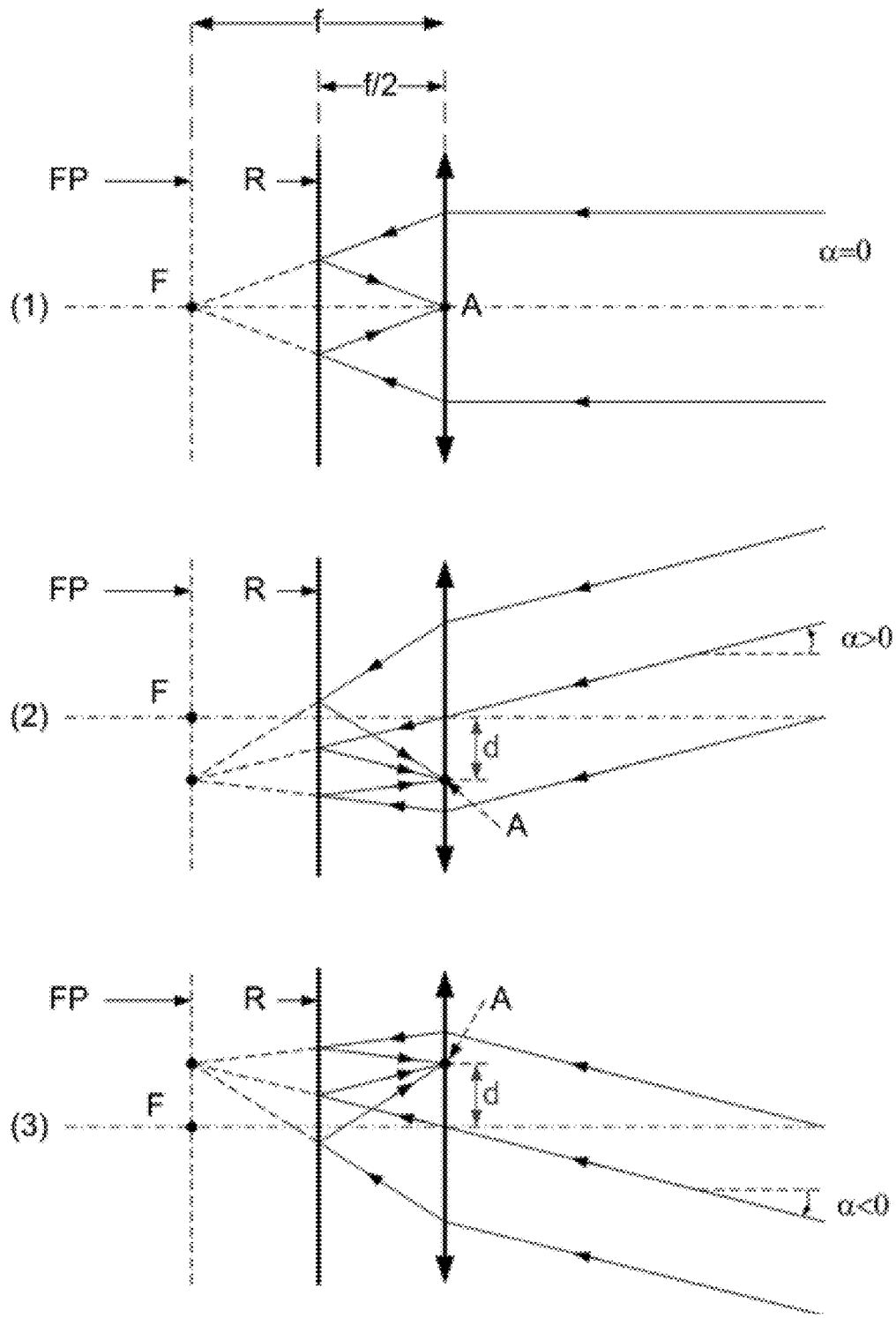
FIG. 4 illustrates a diagram of the position of converging rays as a function of incident angle on a screen with an array of spherical micro-mirrors.

FIG. 4 illustrates a diagram of the position of converging rays as a function of incident angle on a screen 400, the screen 400 being configured similar to the screen 300 described herein with reference to FIGS. 3A-3C. By changing the location of a non-polarizing light scattering section 406 (e.g., point A) of a polarization layer on the front area of a micro-lens, the incident angle, a, of the incident parallel light rays, which can be diffusely scattered by the scattering section 406, can be changed to have positive incident angles and negative incident angles. Therefore, depending at least in part on the location of the light scattering section 406, some incident light ray directions can be selected for transmission through the lens at point A. This transmitted light can be scattered in selected, targeted, and/or desired directions depending at least in part on the scattering properties of section A. These scattering properties can be made independent of other optical properties of this optical construction.

Figure 5:
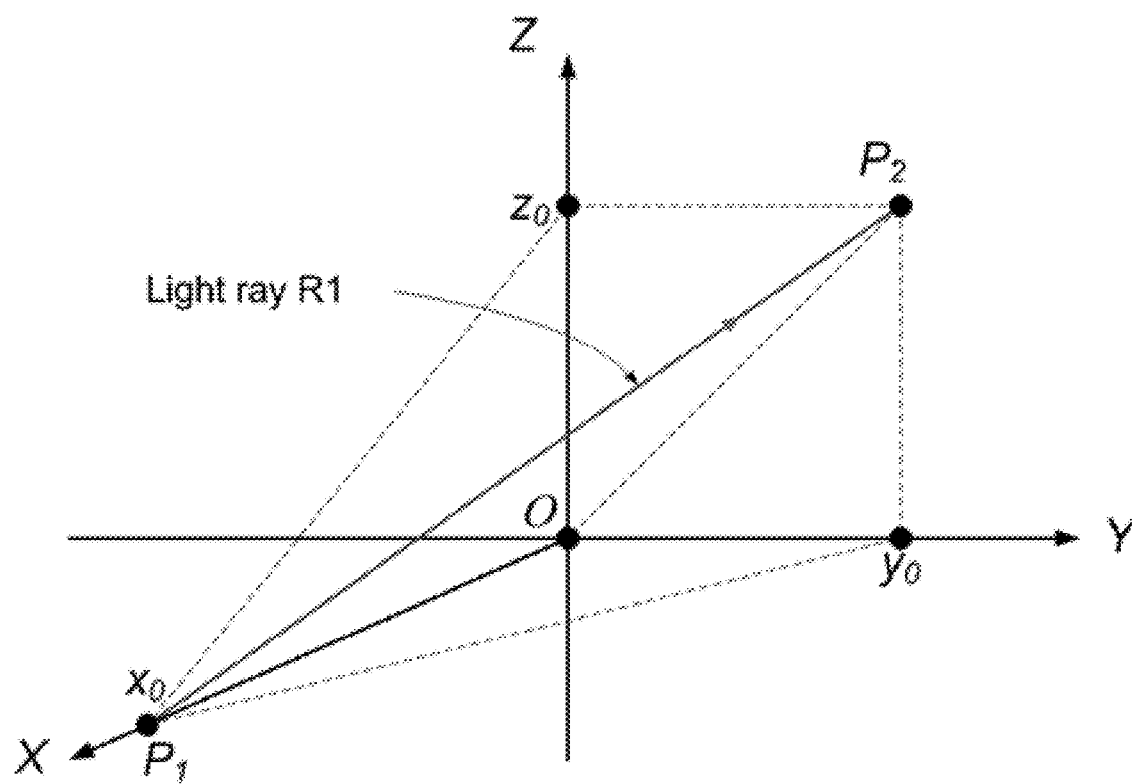
FIG. 5 illustrates a Cartesian coordinate system XYZ with an incident light ray R1 and origin O.

Two-dimensional considerations have been described for micro-lenses without aberrations. The location of the converging rays and the location and size of the non-polarizing light scattering section on the individual micro-lenses for incident directions can also be described in three dimensions. For example, FIG. 5 illustrates a Cartesian coordinate system XYZ with an incident light ray R1 and origin O. The point P1 represents the center of the exit pupil of the projection lens of the projector, and the optical axis of the projection-lens coincides with the x-axis. The point P2 has the coordinates $(0, y_0, z_0)$ and corresponds with the center of curvature of a micro-lens. The light ray R1 travels from P1 to the center of curvature of a micro-lens at P2. For convenience, light ray R1 can be represented by the vector P1P2.

Incident light rays on the micro-lens (with center of curvature of the micro-lens at $(0, y_0, z_0)$) with the same direction as the vector P1P2 can exit at substantially the same location on the surface of the micro-lens after refraction by the micro-lens and reflection by reflection layer (e.g., reflection layer 303 described herein with reference to FIGS. 3A-3C). This location, in a first approximation, depends at least in part on the direction of the vector P1P2. Aberrations (e.g., spherical aberrations and/or chromatic aberrations) of the micro-lens may cause a smear around the focal point (e.g., the point A described herein with reference to FIGS. 3A-3C and/or FIG. 4). Disadvantageous effects caused by this blurring can be reduced or eliminated by taking into account the aberrations when determining the size of the non-polarizing light scattering section.

The micro-lenses receive light rays from the projector in a selected, desired, targeted, or defined range of incident angles. This range depends in a first approximation on: $z_0$, $y_0$, |OP1|, and the size of the micro-lens (e.g., the length of the side of the micro-lens, D). Light rays within this range of incident angles will exit at different locations on the surface of the micro-lens after refraction by the micro-lens and reflection by a reflection layer (e.g., reflection layer 303 described herein with reference to FIGS. 3A-3C). This spread may be pronounced for small incident angles, and can be controlled at least in part by the size of the micro-lens. This effect, together with the optical aberrations of the micro-lenses, can further motivate changing (e.g., increasing) the cross-section of the non-polarizing light diffusing area (e.g., the non-polarizing light scattering section 306 described herein with reference to FIGS. 3A-3C). The range of incident angles received by a micro-lens also depends at least in part on the size of the exit pupil of the projection lens. A larger exit pupil results in a larger incident angle range, for example.

The range of light-ray incident angles that can be transmitted through a non-polarizing light scattering section (e.g., the non-polarizing light scattering section 306 described herein with reference to FIGS. 3A-3C) of each micro-lens depends at least in part on the area of the cross-section of the non-polarizing light scattering section and an advantageous or preferable size depends at least in part on several factors including, for example and without limitation: the location $(0, y_0, z_0)$ of the micro-lens, the projection distance |OP1|, the size of the micro-lens, the diameter of the exit pupil of the projection lens, and the lens aberrations. Making the cross-section area of the non-polarizing light scattering section larger than this advantageous or preferable size may allow more directions of incident light rays to be transmitted through the non-polarizing light scattering section. This may be undesirable because these light rays with larger incident angles may be from 'peripheral light,' e.g., cross-reflected and/or ambient incident light rays. Making the cross-section area of the non-polarizing light scattering section smaller than this advantageous or preferable size may cause absorption of light rays from the projector in the polarization layer (e.g., the polarization layer 302 described herein with reference to FIGS. 3A-3C).

To further tailor the cross-section area of the non-polarizing light scattering section, it may be advantageous to reduce the spherical aberration of the micro-lenses by using tailored aspheric micro-lenses instead of, or in addition to, spherical micro-lenses.

The above embodiments have been described with respect to an on-axis projection system, which is an example of a possible projection set-up. However, a similar front projection screen can also be dimensioned for off-axis projection.

The above embodiments have been described with reference to micro-lenses having a square shape in the frontal plane. It is to be understood that the use of micro-lenses with a rectangular, circular, polygonal or arbitrary shape in the frontal plane is within the scope of this description.

The birefringence of the material of the micro-lenses can be configured to be sufficiently low to preserve the polarization state of light that propagates in the micro-lenses. The light reflecting layer can also be configured to sufficiently preserve the polarization state of the light. The material used for the non-polarizing light scattering can be of the forward scattering type, for example and without limitation.

A projector-screen combination, with projection screens as described herein, can be configured to diffusely reflect light rays emerging from the projector of this projector-screen combination. This is due at least in part to the described front projection screen comprising multiple multi-layer structures that have micro-lenses that diffusely reflect light rays with incident directions in a relatively small range around the direction of a vector P1P2 (e.g., the incident light ray vector described with reference to FIG. 5) from the center of the exit pupil of the projection lens to the center of curvature of the micro-lenses.

Cross-reflected light rays in immersive display systems, examples of which are described herein in greater detail with reference to FIGS. 2A-2B, can hit the screen at each micro-lens with incident directions different from the relatively small range around the direction of the vector P1P2, and these cross-reflected light rays can be absorbed by the screen. Therefore, the described optical system can be configured to substantially reduce the cross-reflection towards the viewers and to have a substantially higher contrast ratio compared with other types of front projection screens.

Ambient light can also hit the screen at each micro-lens with incident directions different from the relative small range around the direction of the vector P1P2, and these light rays can be absorbed by the screen. Therefore, the described optical system can be configured to substantially reduce the reflection of incident ambient light towards the viewers and to have a substantially higher contrast ratio compared with other types of front projection screens.

Example Screens with Spherical and/or Aspheric Micro-Mirrors

Figure 6A:
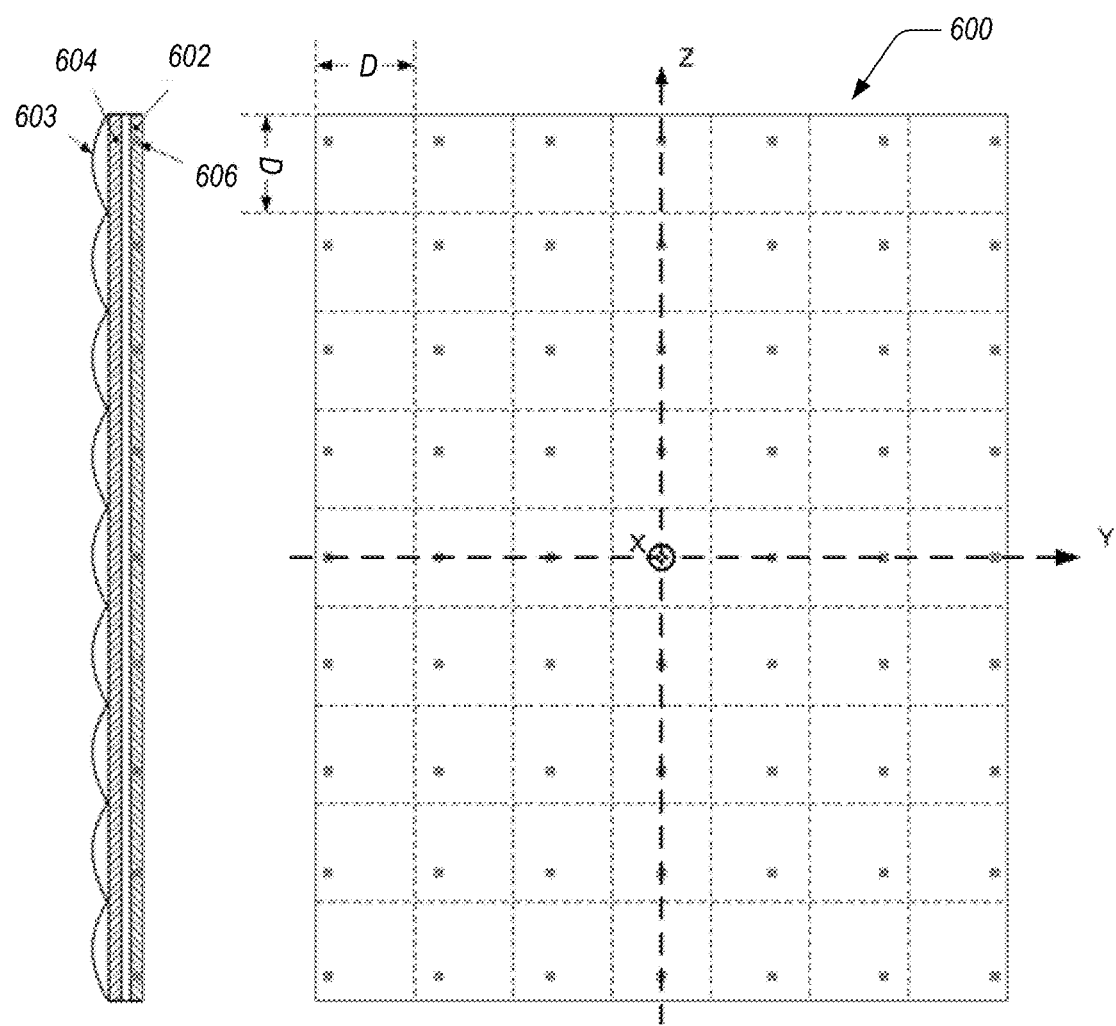
FIG. 6A illustrates a cross-section view and a front view of a front projection screen with an array of spherical micro-mirrors for a projection set up with the optical axis substantially coinciding with the x-axis.

FIG. 6A illustrates a cross-section view and a front view of a front projection screen 600 with an array of micro-mirrors 603 for a projection set up with the optical axis substantially coinciding with the x-axis. The front projection screen 600 has a multi-layer structure comprising a sheet with an array of spherical micro-mirrors 603, a polarization rotation layer 604 on top of these micro-mirrors 603, and a linear polarization layer 602 on top of the polarization layer 604. It is to be understood that one or more layers may be added to this structure in between one or more of the referenced layers, on top of these layers, or beneath these layers. The micro-mirrors 603 can have a radius R and have, for example and without limitation, a square front shape with sides of length D. The layer with the linear polarizer 602 can have a small section of non-polarizing light scattering material 606 in front of individual micro-mirrors. The location of this non-polarizing light scattering section 606 depends at least in part on the location of the micro-mirror in the array of micro-mirrors 603. This location can depend at least in part on the projector set-up as described herein.

Figure 6B:
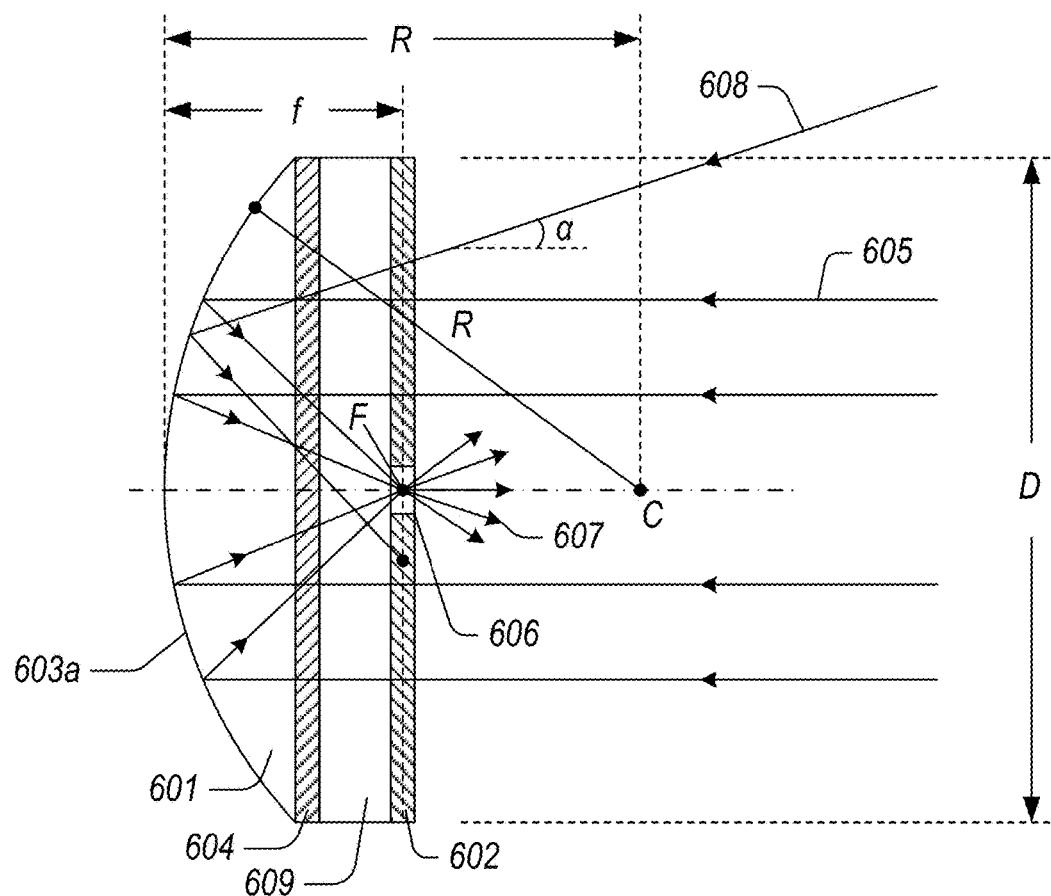
FIGS. 6B and 6C illustrate a cross-section view of a single spherical micro-mirror with polarization layer having a section of non-polarizing light scattering material and polarization rotating layer.

FIG. 6B illustrates a cross-section view of a single micro-mirror 603a with polarization layer 602 having a section of non-polarizing light scattering material 606, and polarization rotating layer 604. The micro-mirror 603a can include a medium 601 through which light propagates before reaching the reflective surface of the micro-mirror 603a. The micro-mirror 603a can include a layer 609 between the polarization layer 602 and the polarization rotating layer 604 (e.g., these layers can be separate sheets). The layer 609 can be a functional layer, providing additional functionality to the micro-mirror 603a. For example, individual micro-mirrors can be spherical mirrors with radius R. The focal point F is located at a distance f=R/2. A horizontal bundle of random polarized parallel light rays 605 with an incident angle α=0, for example and without limitation, can be linearly polarized by the polarization layer 602 and can be reflected by the mirror 603a in the direction of the focal point F. The polarization direction of these linear polarized light rays can be rotated over 90° by traveling twice through the polarization rotating layer 604. The non-polarization light scattering section 606 can be located around the focal point F. The light rays that reach the focal point F can thus travel through the section 606 and can be scattered. These linearly polarized light rays can be substantially unaffected by the polarization layer 602 due at least in part to the fact that these light rays travel through the non-polarizing light scattering section 606. The bundle of light rays 607 represents the scattered light rays. The scattering characteristics of the light scattering section can be symmetrical or asymmetrical, and can be adapted to the needs of the application, independent of other optical characteristics of this optical construction.

Randomly polarized incident light rays having an angle α>0 or α<0 can hit the linear polarization layer 602 again. Because the polarization state of the light arriving back at the linear polarizer 602 is rotated over 90°, these light rays can be absorbed by the polarization layer 602. An example of such a ray is light ray 608.

The above optical construction can be configured to diffusely reflect light with incident angle of about α=0, and will absorb the incident light with incident angle of about α>0 and about α<0. The scattering properties are based at least in part on the scattering properties of the material in the small section 606 around the focal point F of the spherical mirror, and can be made independent of other optical properties of this optical construction.

Figure 6C:
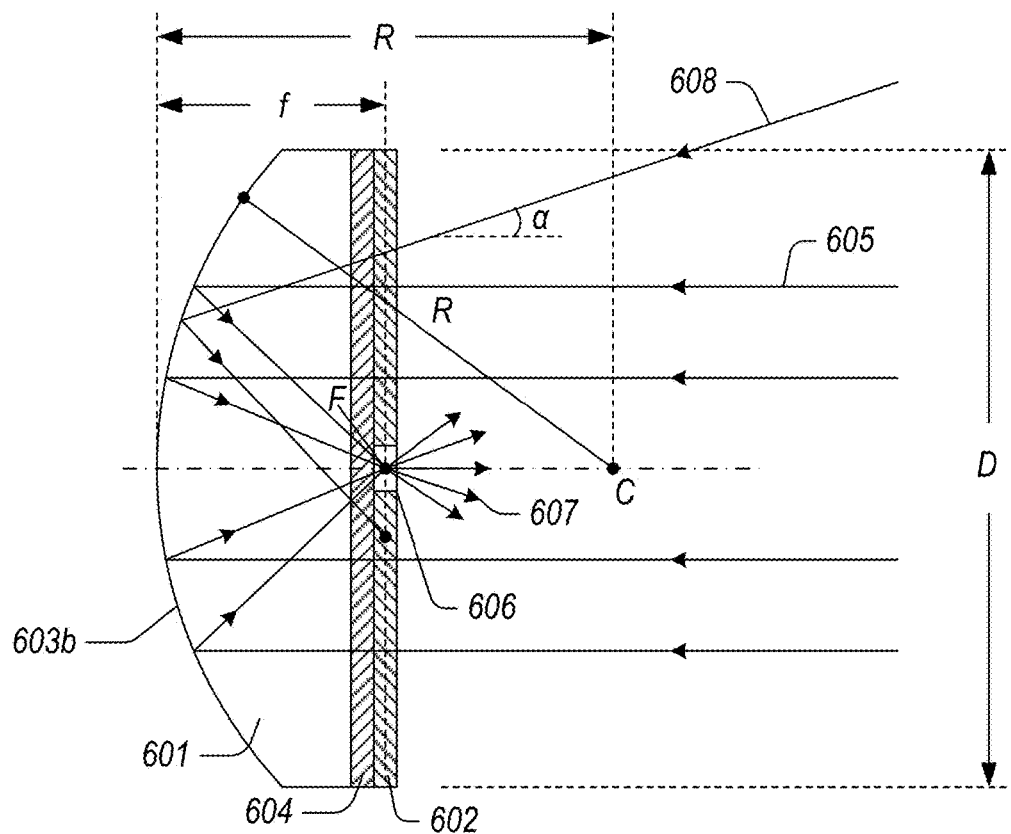

Another example of a micro-mirror 603b is illustrated in FIG. 6C where the polarization layer 602 and the polarization rotating layer 604 are integrated sheets (e.g., not separate sheets). This can simplify the mechanical construction of this optical assembly.

Figure 7:
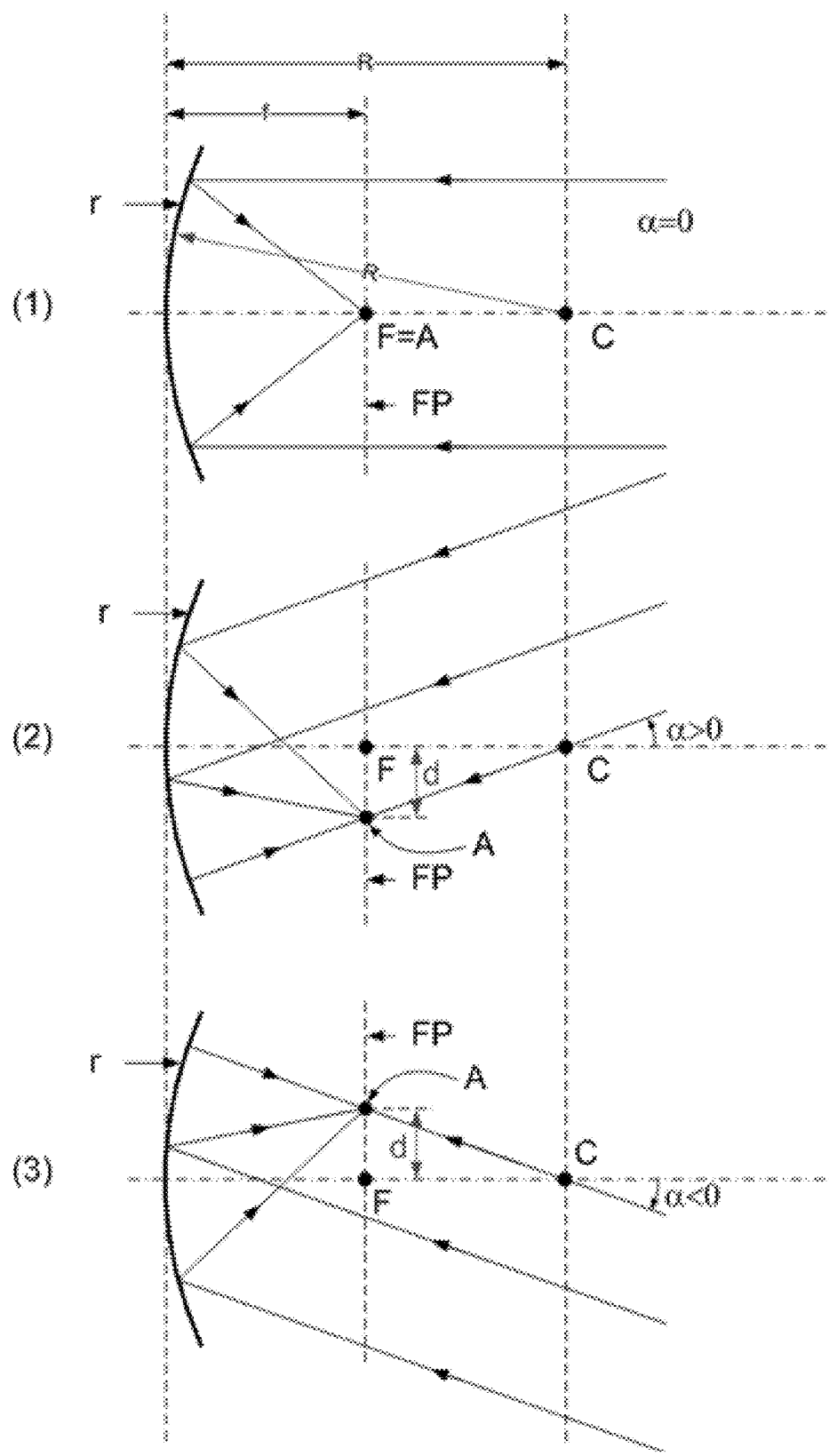
FIG. 7 illustrates a diagram of the position of converging rays as a function of incident angle on a screen with an array of spherical micro-mirrors.

FIG. 7 illustrates that by changing the location of the non-polarizing light scattering section A of the polarization layer (e.g., the polarization layer 602 described herein with reference to FIGS. 6A-6C), the incident angle α of the incident parallel light bundles diffusely scattered by the scattering section A can be changed to positive incident angles and/or negative incident angles. Depending at least in part on the location of the light scattering section A, some targeted, selected, or desired incident light ray directions can be selected for transmission through A. This transmitted light can be scattered in targeted, selected, or desired directions depending at least in part on the scattering properties of section A. These scattering properties can be made independent of other optical properties of this optical construction.

Two-dimensional considerations have been described for micro-mirrors without aberrations. The considerations for determining the location and the size of the non-polarizing light scattering section for a three-dimensional set-up are similar as described herein. For example, FIG. 5 illustrates a Cartesian coordinate system XYZ with an incident light ray R1 and origin O. The point P1 is the center of the exit pupil of the projection lens of the projector, and the optical axis of the projection lens coincides with the x-axis. The point P2 has the coordinates $(0, y_0, z_0)$ and corresponds with the center of curvature of a micro-mirror. The light ray R1 travels from P1 to the center of curvature of a micro-mirror at P2. For convenience, the light ray R1 can be represented by the vector P1P2.

Incident light rays on the micro-mirror (with center of curvature of the micro-mirror at $(0, y_0, z_0)$ with the same direction as the vector P1P2 can be configured to arrive at substantially the same location on the polarization layer (e.g., the polarization layer 602 described herein with reference to FIGS. 6A-6C) after reflection by the micro-mirror. This location, in a first approximation, depends at least in part on the direction of the vector P1P2. Aberrations (e.g. spherical aberrations) of the micro-mirror may cause a smear around the focal point (e.g., the point F described herein with reference to FIGS. 6A-6C and/or FIG. 7). Disadvantageous effects caused by this blurring can be reduced or eliminated by taking into account the mirror aberrations when determining the size of the non-polarizing light scattering section.

The micro-mirrors can receive light rays from the projector in a selected, desired, targeted, or defined range of incident angles. This range depends in a first approximation on: $z_0$, $y_0$, |OP1|, and the size of the micro-mirrors (e.g., a length of the side of a micro-mirror, D). Light rays within this range of incident angles can arrive at different locations on the polarization layer (e.g., polarization layer 602 described herein with reference to FIGS. 6A-6C) after reflection by the micro-mirrors. This spread may be pronounced for small incident angles, and can be controlled at least in part by the size of the micro-mirrors. This effect, together with the optical aberrations of the micro-mirrors, can further motivate changing (e.g., increasing) the cross-section of the non-polarizing light diffusing area (e.g., the non-polarizing light scattering section 606 described herein with reference to FIGS. 6A-6C). The range of incident angles received by a micro-mirror also depends at least in part on the size of the exit pupil of the projection lens. A larger exit pupil results in a larger incident angle range, for example.

The range of light-ray incident angles that can be transmitted through a non-polarizing light scattering section (e.g., the non-polarizing light scattering section 606 described herein with reference to FIGS. 6A-6C) of each micro-mirror structure depends at least in part on the area of the cross-section of the non-polarizing light scattering section and an advantageous or preferable size depends at least in part on several factors including, for example and without limitation: the location $(0, y_0, z_0)$ of the micro-mirror, the projection distance |OP1|, the size of the micro-mirror, the diameter of the exit pupil of the projection lens, and the mirror aberrations. Making the cross-section area of the non-polarizing light scattering section larger than this advantageous or preferable size may allow more directions of incident light rays to be transmitted through the non-polarizing light scattering section. This may be undesirable because these light rays with larger incident angles may be from 'peripheral light,' e.g., cross-reflected and/or ambient incident light rays. Making the cross-section area of the non-polarizing light scattering section smaller than this advantageous or preferable size may cause absorption of light rays from the projector in the polarization layer (e.g., the polarization layer 602 described herein with reference to FIGS. 6A-6C).

To further tailor the cross-section area of the non-polarizing light scattering section, it may be advantageous to reduce the spherical aberration of the micro-mirrors by using tailored aspheric micro-mirrors instead of, or in addition to, spherical micro-mirrors.

The above embodiments have been described with respect to an on-axis projection system, which is an example of a possible projection set-up. However, a similar front projection screen can also be dimensioned for off-axis projection.

The above embodiments have been described with reference to micro-mirrors having a square shape in the frontal plane. It is to be understood that the use of micro-mirrors with a rectangular, circular, polygonal or arbitrary shape in the frontal plane is within the scope of this description.

The light reflecting layer of the micro-mirrors can be configured to preserve sufficiently the polarization state of the light. The material used for the non-polarizing light scattering can be of the forward-scattering type, for example and without limitation.

A projector-screen combination, with projection screen as described above, can diffusely reflect light rays emerging from the projector of this projector-screen combination. This is due at least in part to the described front projection screen comprising multiple multi-layer structures that have micro-mirrors that diffusely reflect light rays with incident directions in a relatively small range around the direction of a vector P1P2 (e.g., the incident light ray vector described with reference to FIG. 5) from the center of the exit pupil of the projection lens to the center of curvature of the micro-mirrors.

Cross-reflected light rays in immersive display systems, examples of which are described herein in greater detail with reference to FIGS. 2A-2B, can hit the screen at each micro-mirror with incident directions different from the relatively small range around the direction of the vector P1P2, and these cross-reflected light rays can be absorbed by the screen. Therefore, the described optical system can be configured to substantially reduce the cross-reflection towards the viewers and to have a substantially higher contrast ratio compared with other types of front projection screens.

Ambient light can also hit the screen at each micro-mirror with incident directions different from the relative small range around the direction of the vector P1P2, and these light rays can be absorbed by the screen. Therefore, the described optical system can be configured to substantially reduce the reflection of incident ambient light towards the viewers and to have a substantially higher contrast ratio compared with other types of front projection screens.

Example Screens with Cylindrical Micro-Lenses

Figure 8:
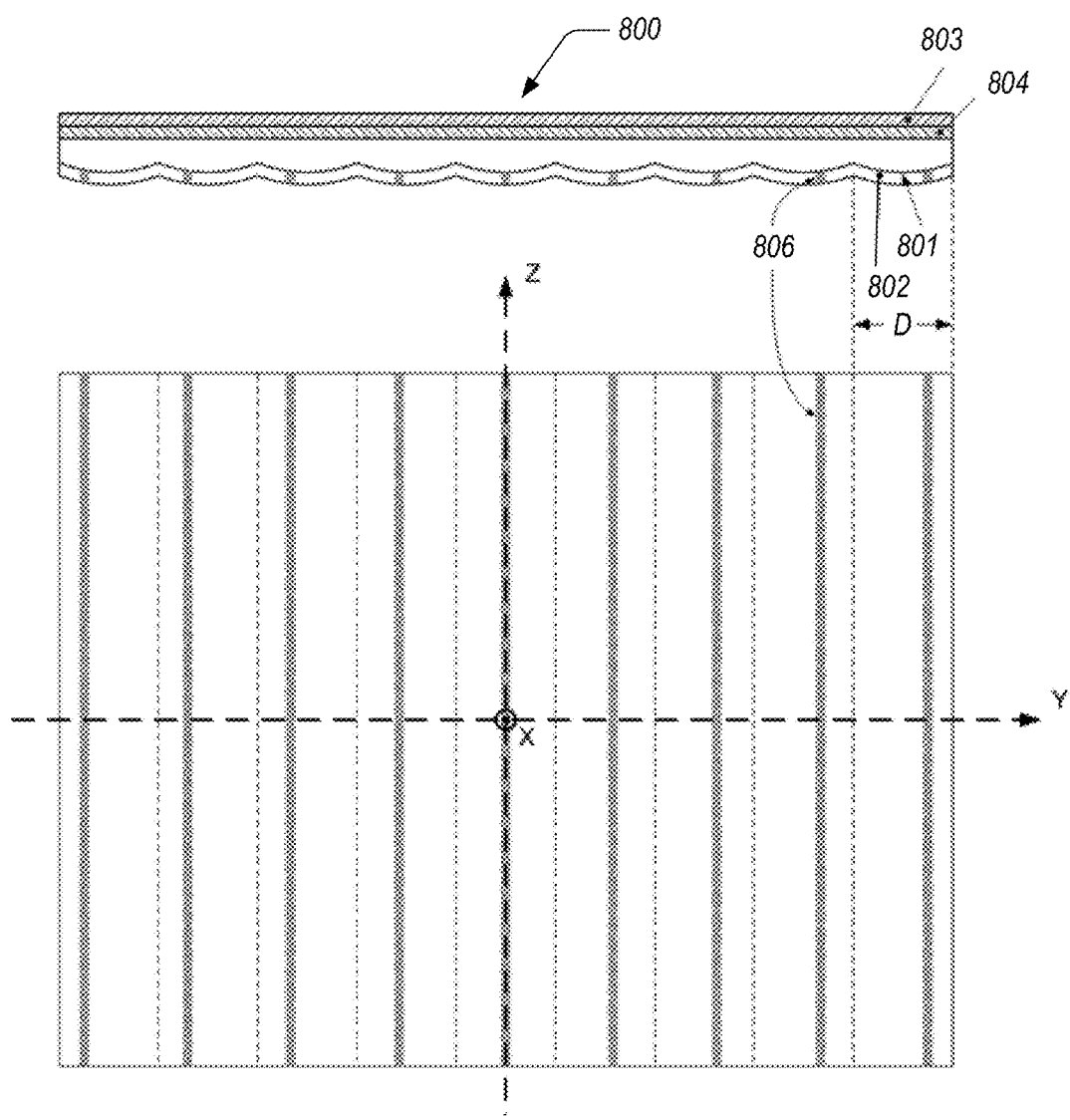
FIG. 8 illustrates a cross-section view and a front view of a front projection screen with an array of cylindrical micro-lenses for a projection set up with the optical axis substantially coinciding with the x-axis.

FIG. 8 illustrates a cross-section view and a front view of a front projection screen 800 with cylindrical micro-lenses 801 for a projection set up with the optical axis substantially coinciding with the x-axis. The front projection screen 800 has a multi-layer structure comprising a sheet of cylindrical micro-lenses 801 with a layer of light polarization material 802 on top of these cylindrical micro-lenses 801. The backside of the sheet of cylindrical micro-lenses 801 can have a polarization rotation layer 804 followed by a light reflection layer 803. Individual cylindrical lenses have a radius, R, a refractive index, n, and a width D. The layer of light polarizing material 802 on top of the cylindrical lenses 801 has a strip of non-polarizing light scattering material 806 with a width, w, for each cylindrical lens. The position of this non-polarizing light scattering strip 806 depends at least in part on the location of the cylindrical lens 801 in the array. Moreover, the position of this non-polarizing light scattering strip 806 depends at least in part on the projector set-up, as described in greater detail herein.

To illustrate functionality of the screen 800, reference is made again to FIG. 5. FIG. 5 illustrates a Cartesian coordinate system XYZ with an incident light ray R1 and origin O. The point P1 is the center of the exit pupil of the projection lens of the projector, and the optical axis of the projection lens coincides with the x-axis. The point P2 has the coordinates $(0, y_0, z_0)$ and corresponds with the center of curvature of a micro-lens. The light ray R1 travels from P1 to the center of curvature of a micro-lens at P2. For convenience, the light ray R1 can be represented by the vector P1P2.

Figure 9A:
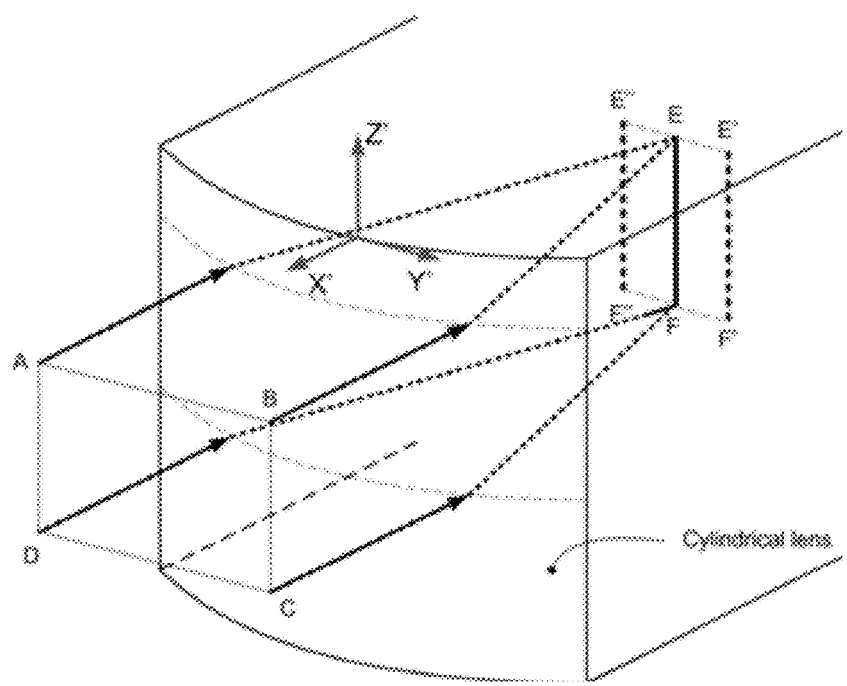
FIG. 9A-9D illustrate a bundle of parallel light rays that is focused on a line segment by a cylindrical lens.
Figure 9B:
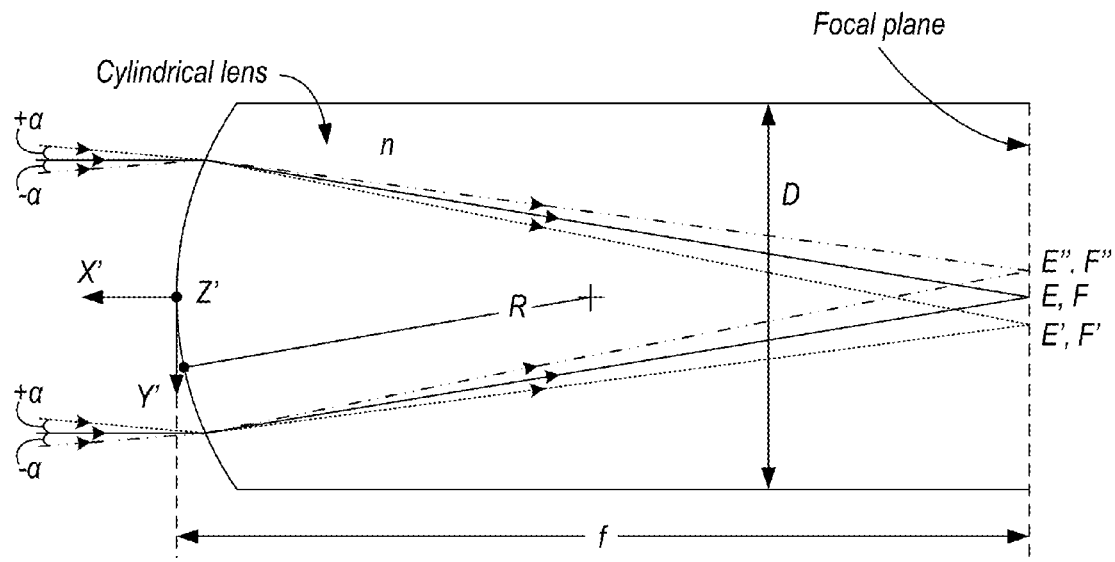
Figure 9C:
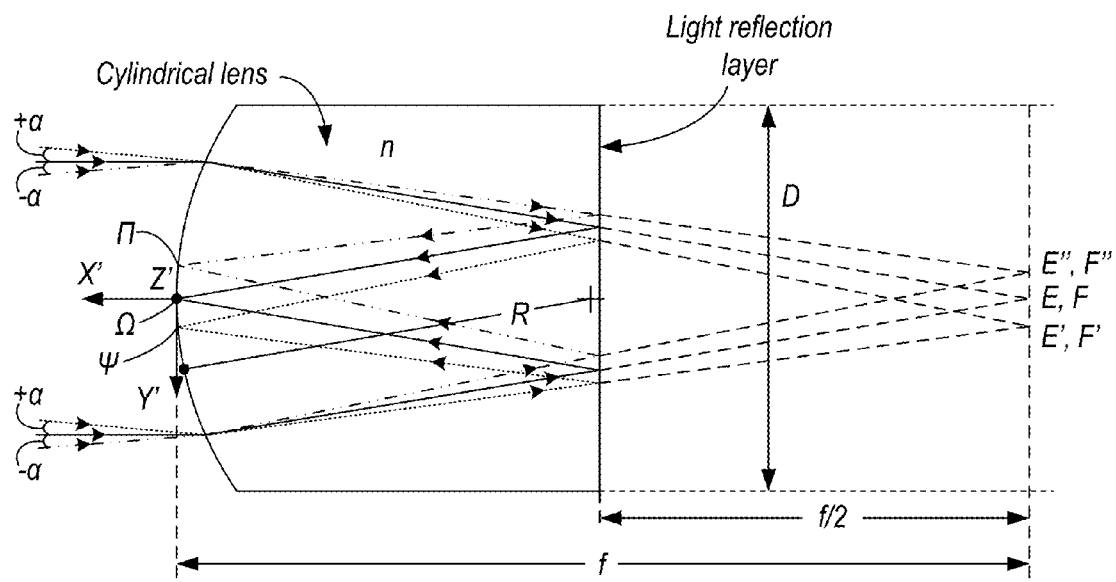

Each cylindrical micro-lens with radius R and refractive index n has a focal plane located at a distance f. The following examples of the refraction of light rays by cylindrical lenses can be used to illustrate features of embodiments having cylindrical lenses. FIG. 9A illustrates a bundle ABCD of parallel light rays, parallel with the X'-axis ($\alpha=0$ and $\beta=0$, where the angle $\alpha$ is an angle from the X' axis within the X'Y'-plane and the angle $\beta$ is an angle from the X'Y'-plane), that is focused on the line EF. FIGS. 9B and 9C illustrate, in two dimensions rather than three, bundles of parallel light rays that form angles of $+\alpha$, 0, and $-\alpha$, in a plane parallel with the X'Y'-plane. These parallel light rays are respectively focused on the lines E'F', EF, and E"F". FIG. 9C illustrates the incident bundles of light rays on a cylindrical lens with a light reflection layer located at a distance f/2 from the focal plane of the cylindrical lens. In such embodiments, the light rays are reflected and the bundles of parallel light rays are focused as line segments parallel with the Z'-axis at the location Ω for $\alpha=0$, Ψ for $+\alpha$, and Π for $-\alpha$, on the lens surface.

Figure 9D:
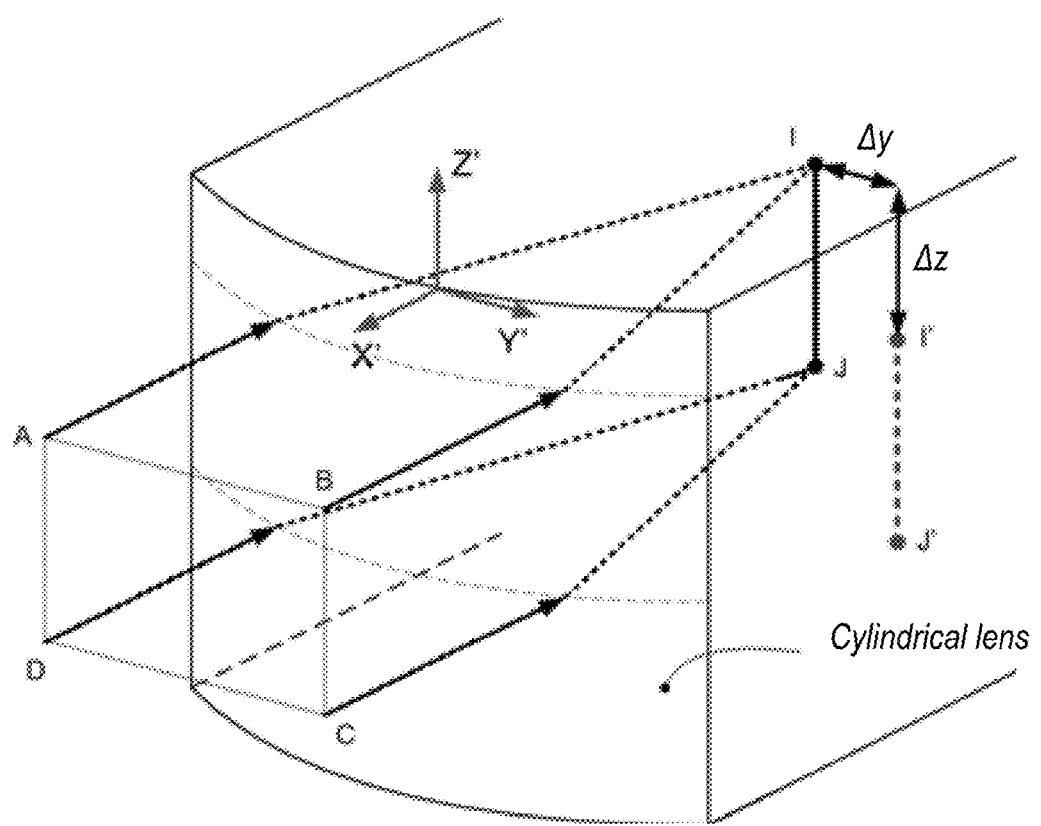

FIG. 9D illustrates a refracted bundle ABCD of parallel light rays in the focal plane of the cylindrical lens for $\alpha=0$ and $\beta=0$, wherein these parallel light rays are focused on the line I J. Where a bundle of parallel light rays has a different incident angle, the focal location is different. For example, where the incident angle for the parallel light rays has an angle $\alpha>0$ and an angle $\beta>0$ the focal location is the line I' J' where the horizontal shift $\Delta y$ depends on $\alpha$, and the vertical shift $\Delta z$ depends on $\beta$. For cylindrical lenses, different bundles of parallel light rays with the same angle $\alpha$ and different angles $\beta$ are refracted to line segments in the focal plane of the cylindrical lens, wherein the line segments have the same shifted distance from the line I J (e.g., $\Delta y$) but different shifted distances along the Z'-axis (e.g., $\Delta z$). The shift $\Delta y$ depends on $\alpha$ and $\Delta z$ is depends on $\beta$.

In some embodiments, the cylindrical lens can include a reflection layer (e.g., as described herein with reference to FIGS. 8 and 9C). The light reflection layer can be located at a distance f/2 from the focal plane of the cylindrical lens. The light reflection layer can reflect light rays back to the surface of the cylindrical lens, Bundles of parallel rays with the same angle $\alpha$ can be focused on the surface of cylindrical lens on line segments shifted over the same distance $\Delta y$. These bundles of parallel light rays may have different angles $\beta$ and can consequently be shifted different distances $\Delta z$ along the Z' axis. The strip of light scattering material (e.g., light scattering material 806 described herein with reference to FIG. 8) can be configured to coincide with targeted line segments (e.g., the light scattering material can be parallel with the Z'-axis) to scatter targeted light rays. Similarly, other bundles of light rays with differing incident angles can be refracted and reflected so that they do not coincide with the strip of light scattering material such that they are substantially absorbed by the light polarization layer (e.g., the light polarization layer 802 described herein with reference to FIG. 8). In this way, the screen can be configured to selectively scatter light toward a viewer when the incident light is incident on the screen within a targeted range of incident angles.

The direction of the incident light rays on the projection screen that are emerging from the center of the exit pupil of the projection lens can be characterized by the angles $\alpha$ and $\beta$ for each position on the screen. These angles can be determined using, for example, the projector's exit pupil position, the orientation of the projector relative to the projection screen, and the size of the projection screen. The projection screen can be divided in cylindrical lenses with axes parallel with the Z-axis and width D (e.g., examples of which are described herein with reference to FIG. 8).

The cylindrical lenses of a screen (e.g., a front projection screen, a primary projection screen, a secondary projection screen, etc.) can receive light rays from its projector in a relatively small range of angles $\Delta\alpha$ around $\alpha_0$ $(y_0, z_0)$, and individual cylindrical lenses can be configured to have a vertical strip with a width w of non-polarizing light scattering material positioned where the refracted and/or reflected light rays from the projector are directed. Light from other directions in the X'Y'-plane may not arrive at the non-polarizing light scattering strip and therefore may be absorbed by the screen. Thus, light from the projector can be scattered to be viewable by an audience sitting in a variety of locations relative to the screen whereas ambient light and/or light from different projectors can be absorbed by the screen. As described herein, light rays with directions $-\pi<\beta<\pi$ within the small range of angles $\Delta\alpha$ around $\alpha_0$ $(y_0, z_0)$ may also arrive at the non-polarizing light scattering strip after refraction and reflection, and may be scattered to a viewer or to a location where viewers may be located (e.g., a viewer's space).

The width w of the non-polarizing light scattering strip depends at least in part on several factors. For example, to increase or maximize contrast preservation the width w of the strip of the non-polarizing light scattering strip can be tailored or optimized. The width can be configured to scatter the majority or all of the light from the projector or projectors associated with the screen while absorbing the majority or all of the light arriving from different projectors and/or ambient light. It may be undesirable or disadvantageous to increase the width because this may allow cross-reflected and/or ambient incident light rays in the horizontal planes of the screen to be transmitted through the non-polarizing light scattering strip. Similarly, it may be undesirable or disadvantageous to decrease the width because this may cause absorption of light rays from the projector or projectors associated with the screen.

Several factors can be taken into account to determine a tailored or optimum width of the non-polarizing light scattering strip. Aberrations (e.g. spherical aberration and/or chromatic aberrations) of the cylindrical lens may cause a smear around the focal line (e.g., the line EF described herein with reference to FIGS. 9A-9C). Disadvantageous effects caused by this blurring can be reduced or eliminated by taking into account the aberrations when determining the size of the non-polarizing light scattering strip.

The cylindrical lenses receive light rays from the projector in a selected, desired, targeted, or defined range of incident angles. This range depends in a first approximation on: $z_0$, $y_0$, |OP1|, and the size of the micro-lens (e.g., the width of the cylindrical micro-lens, D). Light rays within this range of incident angles will exit at different locations on the surface of the cylindrical lens after refraction by the cylindrical lens and reflection by a reflection layer (e.g., reflection layer 803 described herein with reference to FIG. 8). This spread may be pronounced for small incident angles, and can be controlled at least in part by the size of the cylindrical lens. This effect, together with the optical aberrations of the cylindrical lenses, can further motivate changing (e.g., increasing) the cross-section of the non-polarizing light diffusing strip (e.g., the non-polarizing light scattering strip 806 described herein with reference to FIG. 8). The range of incident angles received by a cylindrical lens also depends at least in part on the size of the exit pupil of the projection lens. A larger exit pupil results in a larger incident angle range, for example.

To further tailor the cross-section area of the non-polarizing light scattering section, it may be advantageous to reduce the spherical aberration of the cylindrical lenses by using a tailored aspheric shape in the horizontal plane of the cylindrical lens instead of, or in addition to, a spherical shape in the horizontal plane of the cylindrical lenses.

The above embodiments have been described with respect to an on-axis projection system, which is an example of a possible projection set-up. However, a similar front projection screen can also be dimensioned for off-axis projection.

The birefringence of the material of the cylindrical micro-lenses can be configured to be sufficiently low to preserve the polarization state of light that propagates in the cylindrical micro-lenses. The light reflecting layer can also be configured to sufficiently preserve the polarization state of the light. The material used for the non-polarizing light scattering can be of the forward scattering type, for example and without limitation.

There are differences between using spherical and cylindrical micro-lenses. For spherical lenses, for example, the position of the light diffusing segment for a given distance |OP1| depends at least in part on both $y_0$ and $z_0$, with reference to FIG. 5. Consequently, light rays with a direction within a relatively small range around the direction of P1P2 get focused on the light diffusing segment and scattered in the viewer's space. Light from directions outside the relatively small range around the direction of P1P2 gets absorbed by the polarization material. For cylindrical lenses, for example, the discrimination between directions occurs primarily in the horizontal plane of the cylindrical lenses. Consequently, the implementation with cylindrical lenses can scatter light in the viewer's space from directions with a relatively small angle range in the horizontal plane and generally a large range of angles in the vertical plane of the cylindrical lenses. Compared with the implementation with cylindrical lenses, the implementation with spherical lenses may be more efficient in suppressing light from other sources other than its associated projector. Cross-reflected light rays may be more efficiently suppressed compared with implementations utilizing cylindrical lenses. Also ambient light may be more efficiently suppressed compared with implementations with cylindrical lenses. The implementations with cylindrical lenses may be easier to manufacture, however. For example, using extrusion processes on large sheets to manufacture cylindrical lens sheets may be easier due at least in part to its fixed cross-sectional profile.

Figure 10A:
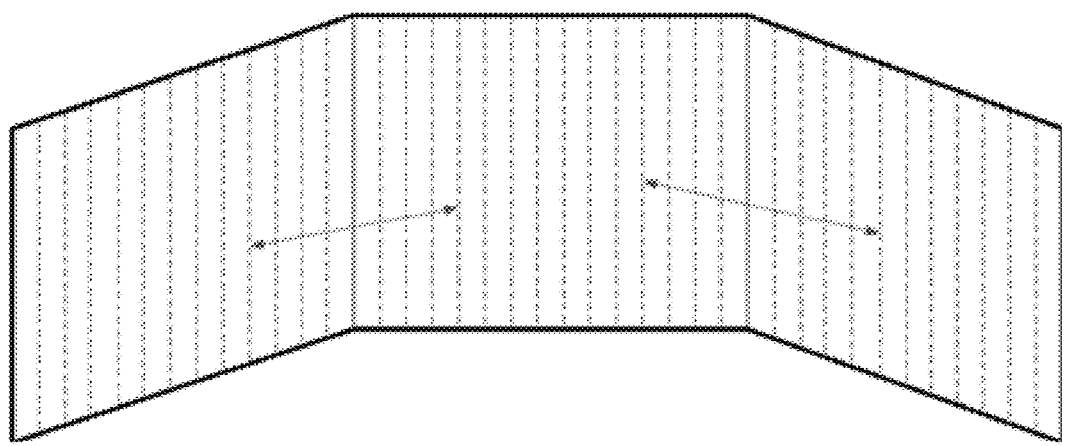
FIGS. 10A and 10B illustrate immersive display systems with a plurality of screens having cylindrical micro-lenses or cylindrical micro-mirrors.
Figure 10B:
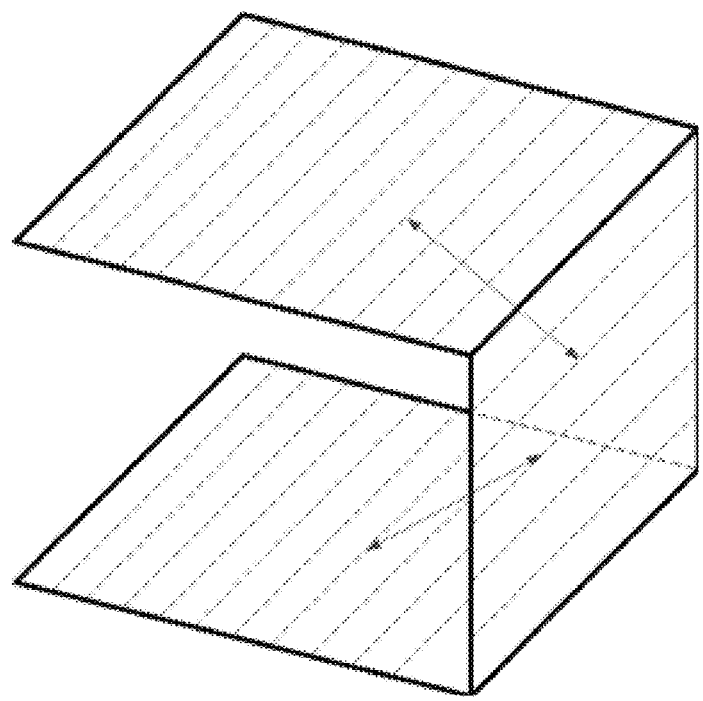

Advantageously, screens with cylindrical lenses can be used to preferentially suppress and/or enhance light from tailored directions. FIGS. 10A and 10B illustrate immersive display systems with a plurality of screens. The dotted lines represent the axes of the cylindrical lenses on the respective screens and the arrows represent the direction of cross-reflected light. For example, with reference to FIG. 10A, front projection screens can be perpendicular to the XY plane or 'approximately' perpendicular to the XY plane (e.g., where 'approximately' means that the screens can have relative small rotations around a horizontal axis) and secondary screens can be tilted with respect to the XY plane. In this case, cross-reflections from the secondary screens on the primary screen and/or from the primary screen on the secondary screens have light rays with directions in horizontal planes or planes with slight inclinations with respect to horizontal planes. In such embodiments, the axes of the cylindrical lenses can be configured to be perpendicular to the XY plane (e.g., parallel to the Z-axis) to preferentially suppress these cross-reflections while preferentially scattering light from the projectors associated with the particular screen. Similarly, another example is illustrated in FIG. 10B that shows an immersive display system having two front projection screens which are parallel or 'approximately' parallel with the XY-plane, e.g. the screens can be mounted on a floor and/or ceiling. In such embodiments, cross-reflections have light rays with directions in vertical planes or planes with slight inclinations with respect to vertical planes. The axes of the cylindrical lenses can be configured to be parallel with the XY plane to preferentially suppress cross-reflections while preferentially scattering light from the associated projectors.

A projector-screen combination, with projection screens as described herein, can be configured to diffusely reflect light rays emerging from the projector of this projector-screen combination. This is due at least in part to the described front projection screen comprising multiple multi-layer structures that have cylindrical micro-lenses that diffusely reflect light rays with incident directions in a targeted angle range in the horizontal plane and a relatively large angle range in the vertical plane. The targeted angle range in the horizontal plane and the relatively large angle range in the vertical plane can include a majority or substantially all of the light ray directions from the projector of this projector-screen combination.

Cross-reflected light rays in immersive display systems, examples of which are described herein in greater detail with reference to FIGS. 2A-2B, can hit the screen at each cylindrical lens with incident directions that are outside the range that is diffusely reflected and these cross-reflected light rays can be absorbed by the screen. Therefore, the described optical system can be configured to substantially reduce the cross-reflection towards the viewers and to have a substantially higher contrast ratio compared with other types of front projection screens.

Ambient light can also hit each cylindrical lens with incident directions outside the range that is diffusely reflected, and these light rays can be absorbed by the screen. Therefore, the described optical system can be configured to substantially reduce the reflection of ambient light towards the viewers and to have a substantially higher contrast ratio compared with other types of front projection screens.

Example Screens with Cylindrical Micro-Mirrors

Figure 11:
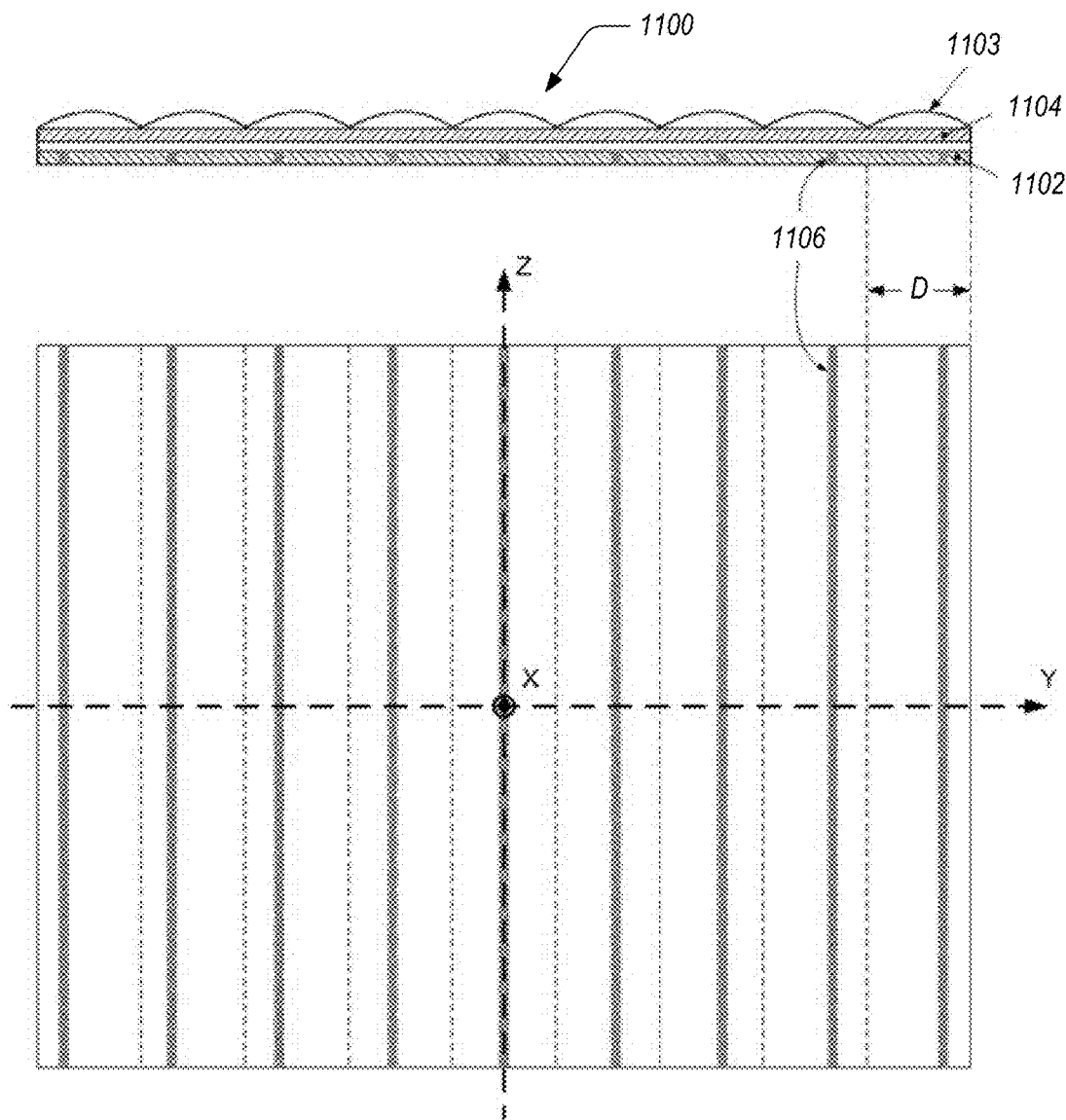
FIG. 11 illustrates a cross-section view and a front view of a front projection screen with an array of cylindrical micro-mirrors for a projection set up with the optical axis substantially coinciding with the x-axis.

FIG. 11 illustrates a cross-section view and a front view of a front projection screen 1100 with cylindrical micro-mirrors 1103 for a projection set up with the optical axis substantially coinciding with the x-axis. The front projection screen 1100 has a multi-layer structure comprising a sheet of cylindrical micro-mirrors 1103 with a polarization rotation layer 1104 on top of these cylindrical micro-mirrors 1103 followed with a layer of light polarization material 1102. Individual cylindrical micro-mirrors 1103 have a radius, R, and width, D. The layer of light polarization material 1102 has a small strip of non-polarizing light scattering material 1106 with a width, w, for each cylindrical micro-mirror. The position of this non-polarizing light scattering strip 1106 depends at least in part on the location of the cylindrical micro-mirror 1101 in the array. Moreover, the position of this non-polarizing light scattering strip 1106 can depend at least in part on the projector set-up as described herein. There are a number of similarities between the example embodiments having cylindrical micro-mirrors and the example embodiments described herein with cylindrical micro-lenses.

To illustrate functionality of the screen 1100, reference is made again to FIG. 5. FIG. 5 illustrates a Cartesian coordinate system XYZ with an incident light ray R1 and origin O. The point P1 is the center of the exit pupil of the projection lens of the projector, and the optical axis of the projection lens coincides with the x-axis. The point P2 has the coordinates $(0, y_0, z_0)$ and corresponds with the center of curvature of a micro-mirror. The light ray R1 travels from P1 to the center of curvature of a micro-mirror at P2. For convenience, the light ray R1 can be represented by the vector P1P2.

The direction of the incident light rays on the projection screen that are emerging from the center of the exit pupil of the projection lens can be characterized by the angles $\alpha$ and $\beta$ for each position on the screen where the angle $\alpha$ is an angle from the X axis within the XY-plane and the angle $\beta$ is an angle from the XY-plane. These angles can be determined using, for example, the projector's exit pupil position, the orientation of the projector relative to the projection screen, and the size of the projection screen. The projection screen can be divided in cylindrical mirrors with axes parallel with the Z-axis and width D (e.g., examples of which are described herein with reference to FIG. 11).

The cylindrical mirrors of a screen (e.g., a front projection screen, a primary projection screen, a secondary projection screen, etc.) can receive light rays from its projector in a relatively small range of angles $\Delta\alpha$ around $\alpha_0$ $(y_0, z_0)$, and individual cylindrical mirrors can be configured to have a vertical strip with a width w of non-polarizing light scattering material positioned where the reflected light rays from the projector are directed. Light from other directions in the X'Y'-plane may not arrive at the non-polarizing light scattering strip and therefore may be absorbed by the screen. Thus, light from the projector can be scattered to be viewable by an audience sitting in a variety of locations relative to the screen whereas ambient light and/or light from different projectors can be absorbed by the screen. As described herein, light rays with directions $-\pi<\beta<\pi$ within the small range of angles $\Delta\alpha$ around $\alpha_0$ $(y_0, z_0)$ may also arrive at the non-polarizing light scattering strip after reflection, and may be scattered to a viewer or to a location where viewers may be located (e.g., a viewer's space).

Figure 12:
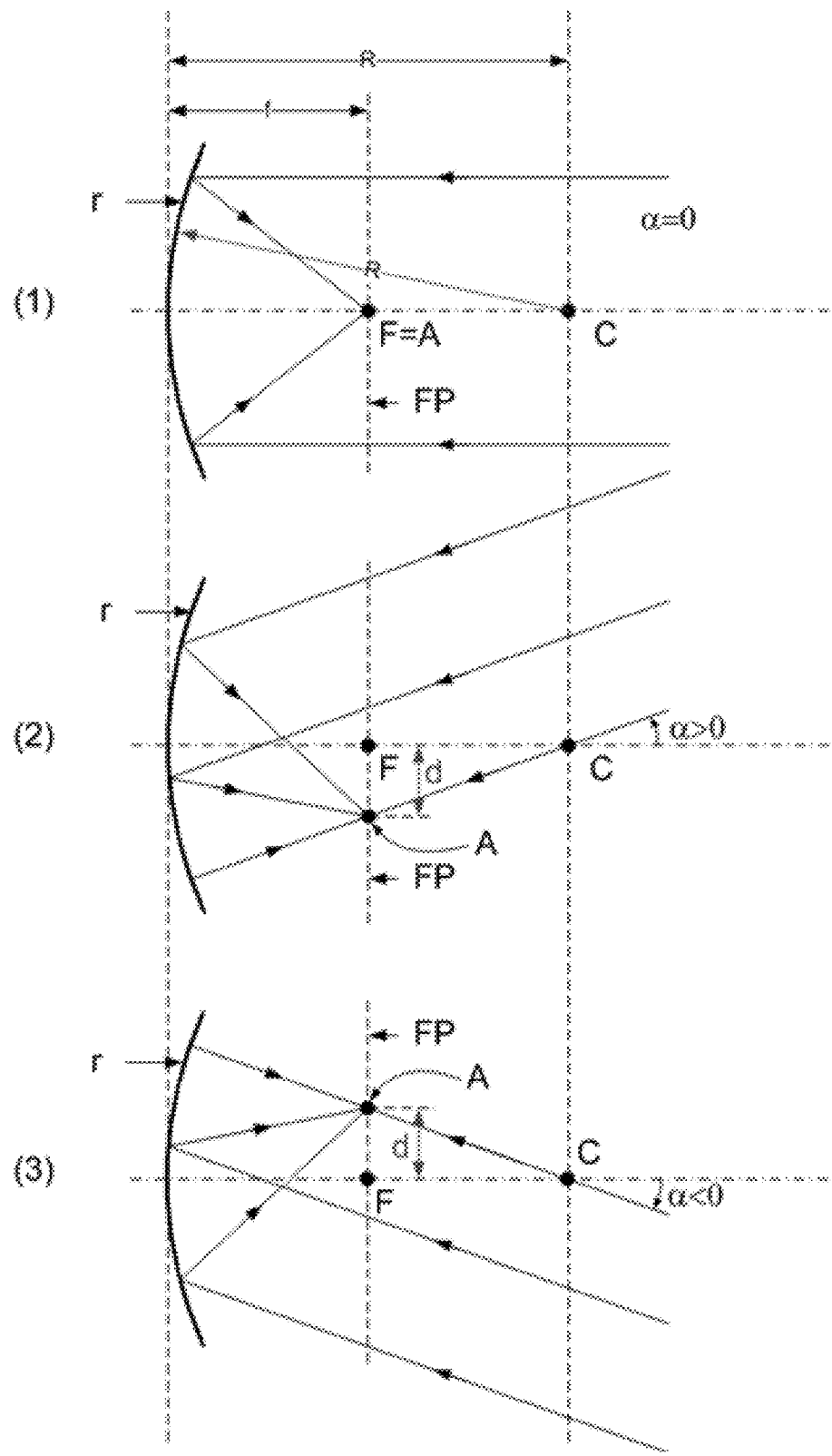
FIG. 12 illustrates a diagram of the position of converging rays as a function of incident angle on a screen with an array of cylindrical micro-mirrors.

FIG. 12 illustrates examples of cylindrical lenses and the positions of the converging rays as a function for incident angle for (1) $\alpha=0$, $\beta=0$; (2) $\alpha>0$, $\beta=0$; and (3) $\alpha<0$, $\beta=0$. Parallel bundles of light rays can be focused on a line segment in the focal plane FP, the line segment represented by the point A in FIG. 12. For light rays emerging from the projector with incident angles $\alpha>0$, $\beta=0$ and/or $\alpha<0$, $\beta=0$ the light scattering strip (e.g., the light scattering strip 1106 described herein with reference to FIG. 11) can be located at the position (e.g., the point A) where the light, rays are converging. It is to be understood that light rays with $-\pi<\beta<\pi$ may also converge to the light scattering strip and may also be scattered in the direction of a viewer.

The width w of the non-polarizing light scattering strip depends at least in part on several factors. For example, to increase or maximize contrast preservation the width w of the strip of the non-polarizing light scattering strip can be tailored or optimized. The width can be configured to scatter the majority or all of the light from the projector or projectors associated with the screen while absorbing the majority or all of the light arriving from different projectors and/or ambient light. It may be undesirable or disadvantageous to increase the width because this may allow cross-reflected and/or ambient incident light rays in the horizontal planes of the screen to be transmitted through the non-polarizing light scattering strip. Similarly, it may be undesirable or disadvantageous to decrease the width because this may cause absorption of light rays from the projector or projectors associated with the screen.

Several factors can be taken into account to determine a tailored or optimum width of the non-polarizing light scattering strip. Aberrations (e.g. spherical aberration and/or chromatic aberrations) of the cylindrical lens may cause a smear around the focal line (e.g., the line represented by the point A described herein with reference to FIG. 12). Disadvantageous effects caused by this blurring can be reduced or eliminated by taking into account the aberrations when determining the size of the non-polarizing light scattering strip.

The cylindrical mirrors receive light rays from the projector in a selected, desired, targeted, or defined range of incident angles. This range depends in a first approximation on: $z_0$, $y_0$, |OP1|, and the size of the micro-mirror (e.g., the width of the cylindrical micro-mirror, D). Light rays within this range of incident angles will exit at different locations of the surface of the screen after reflection by the micro-mirror (e.g., micro-mirror 1103 described herein with reference to FIG. 11). This spread may be pronounced for small incident angles, and can be controlled at least in part by the size of the cylindrical mirror. This effect, together with the optical aberrations of the cylindrical mirrors, can further motivate changing (e.g., increasing) the cross-section of the non-polarizing light diffusing strip (e.g., the non-polarizing light scattering strip 1106 described herein with reference to FIG. 11). The range of incident angles received by a cylindrical mirror also depends at least in part on the size of the exit pupil of the projection lens. A larger exit pupil results in a larger incident angle range, for example.

To further tailor the cross-section area of the non-polarizing light scattering section, it may be advantageous to reduce the spherical aberration of the cylindrical mirrors by using a tailored aspheric shape in the horizontal plane of the cylindrical mirrors instead of, or in addition to, a spherical shape in the horizontal plane of the cylindrical mirrors.

The above embodiments have been described with respect to an on-axis projection system, which is an example of a possible projection set-up. However, a similar front projection screen can also be dimensioned for off-axis projection.

The light reflecting layer can also be configured to sufficiently preserve the polarization state of the light. The material used for the non-polarizing light scattering can be of the forward scattering type, for example and without limitation.

There are differences between using spherical and cylindrical micro-mirrors. For spherical mirrors, for example, the position of the light diffusing segment for a given distance |OP1| depends at least in part on both $y_o$ and $z_o$, with reference to FIG. 5. Consequently, light rays with a direction within a relatively small range around the direction of P1P2 get focused on the light diffusing segment and scattered in the viewer's space. Light from directions outside the relatively small range around the direction of P1P2 gets absorbed by the polarization material. For cylindrical mirrors, for example, the discrimination between directions occurs primarily in the horizontal plane of the cylindrical mirrors. Consequently, the implementation with cylindrical mirrors can scatter light in the viewer's space from directions with a relatively small angle range in the horizontal plane and generally a large range of angles in the vertical plane of the cylindrical mirrors. Compared with the implementation with cylindrical mirrors, the implementation with spherical mirrors may be more efficient in suppressing light from other sources other than its associated projector. Cross-reflected light rays may be more efficiently suppressed compared with implementations utilizing cylindrical mirrors. Also ambient light may be more efficiently suppressed compared with implementations with cylindrical mirrors. The implementations with cylindrical mirrors may be easier to manufacture, however. For example, using extrusion processes on large sheets to manufacture cylindrical mirrors sheets may be easier due at least in part to its fixed cross-sectional profile.

Advantageously, screens with cylindrical mirrors can be used to preferentially suppress and/or enhance light from tailored directions. Similar to the cylindrical lenses described herein with reference to FIGS. 10A and 10B, cylindrical mirrors provide the functionality of preferentially reflecting and/or absorbing light from tailored directions. Applying the illustration in FIGS. 10A and 10B to cylindrical mirrors, the dotted lines represent the axes of the cylindrical mirrors on the respective screens and the arrows represent the direction of cross-reflected light. For example, with reference to FIG. 10A, front projection screens can be perpendicular to the XY plane or 'approximately' perpendicular to the XY plane (e.g., where 'approximately' means that the screens can have relative small rotations around a horizontal axis) and secondary screens can be tilted with respect to the XY plane. In this case, cross-reflections from the secondary screens on the primary screen and/or from the primary screen on the secondary screens have light rays with directions in horizontal planes or planes with slight inclinations with respect to horizontal planes. In such embodiments, the axes of the cylindrical mirrors can be configured to be perpendicular to the XY plane (e.g., parallel to the Z-axis) to preferentially suppress these cross-reflections while preferentially scattering light from the projectors associated with the particular screen. Similarly, another example is illustrated in FIG. 10B that shows an immersive display system having two front projection screens which are parallel or 'approximately' parallel with the XY-plane, e.g. the screens can be mounted on a floor and/or ceiling. In such embodiments, cross-reflections have light rays with directions in vertical planes or planes with slight inclinations with respect to vertical planes. The axes of the cylindrical mirrors can be configured to be parallel with the XY plane to preferentially suppress cross-reflections while preferentially scattering light from the associated projectors.

A projector-screen combination, with projection screens as described herein, can be configured to diffusely reflect light rays emerging from the projector of this projector-screen combination. This is due at least in part to the described front projection screen comprising multiple multi-layer structures that have cylindrical micro-mirrors that diffusely reflect light rays with incident directions in a targeted angle range in the horizontal plane and a relatively large angle range in the vertical plane. The targeted angle range in the horizontal plane and the relatively large angle range in the vertical plane can include a majority or substantially all of the light ray directions from the projector of this projector-screen combination.

Cross-reflected light rays in immersive display systems, examples of which are described herein in greater detail with reference to FIGS. 2A-2B, can hit the screen at each cylindrical mirror with incident directions that are outside the range that is diffusely reflected and these cross-reflected light rays can be absorbed by the screen. Therefore, the described optical system can be configured to substantially reduce the cross-reflection towards the viewers and to have a substantially higher contrast ratio compared with other types of front projection screens.

Ambient light can also hit each cylindrical mirror with incident directions outside the range that is diffusely reflected, and these light rays can be absorbed by the screen. Therefore, the described optical system can be configured to substantially reduce the reflection of ambient light towards the viewers and to have a substantially higher contrast ratio compared with other types of front projection screens.

Example Screens with Perforations for Improved Sound in an Immersive Display System The sound in an immersive display system can be, in some implementations, as important as the visual information. There are acoustic challenges in immersive display systems. For example, if the viewing surface is acoustically reflective, then sound can cause echoes and reverberations within the immersive environment. One way to reduce this issue is to use perforated display screens. Perforated display screens can reduce this problem by allowing the sound to exit the immersive environment and by allowing the sound from speakers behind the display screens to enter the immersive environment.

In some embodiments, sound systems may be mounted behind the primary projection screen(s) and/or secondary screen(s). To reduce high frequency attenuation of sound waves, arrays of perforations (e.g. circular holes) can be used. The perforation in a screen may be laid out so that the centers of the holes are approximately equidistant in a staggered or straight hole arrangement, for example. The number of equidistant circular holes per unit area, the hole diameter, and the screen thickness are parameters that determine, at least in part, the transmission loss at frequencies larger than about 1 kHz.

Figure 13A:
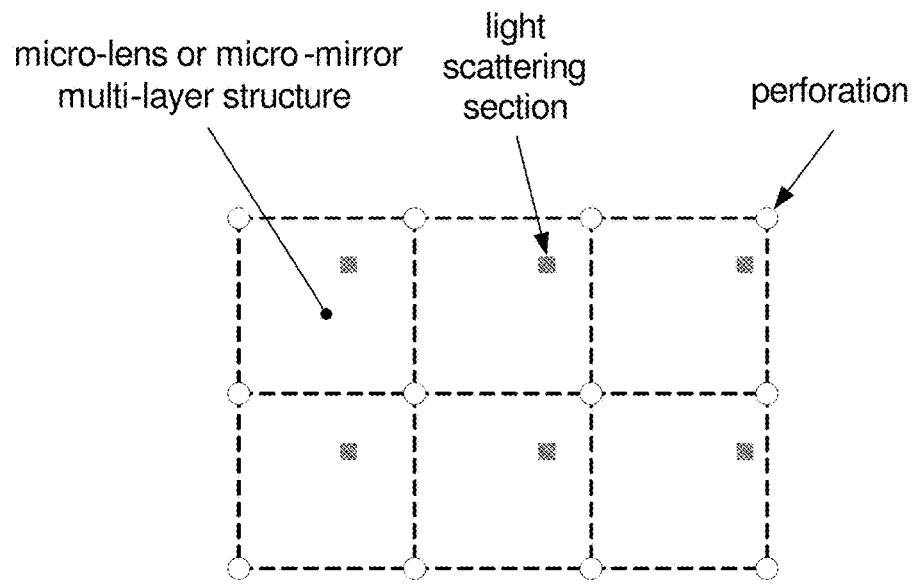
FIGS. 13A and 13B illustrate examples of screens with straight equidistant perforations at the corners between the micro-lenses or micro-mirrors and perforations at the corners and at the edges between micro-lenses or micro-mirrors.
Figure 13B:
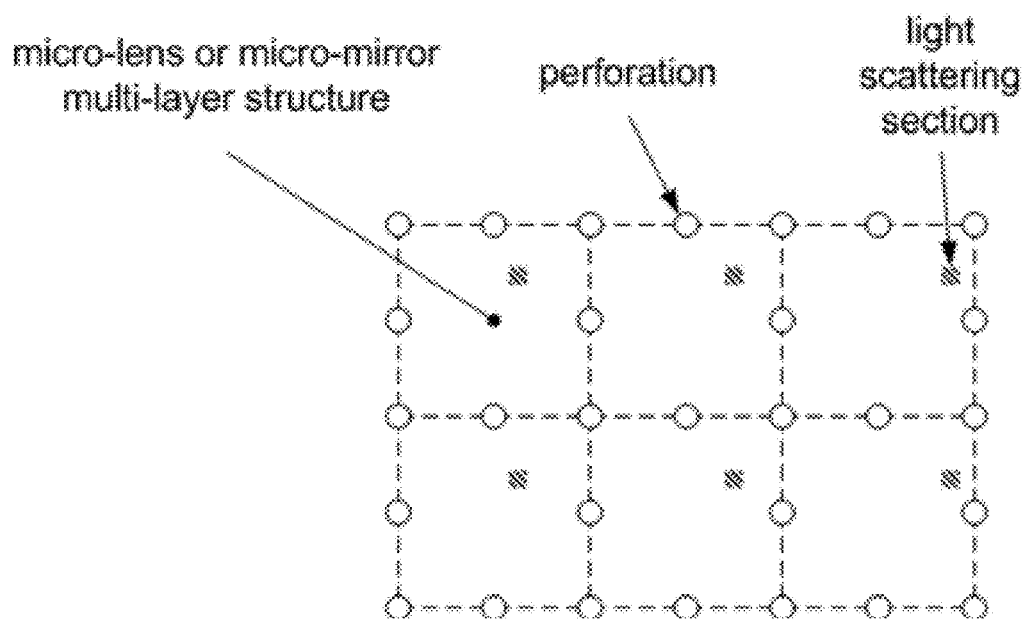

For screens with the structures of micro-lenses and/or micro-mirrors, the array of perforation (or holes) can be located at transitions between micro-lenses or micro-mirrors. These locations for the perforations can provide improved performance because at these transitions from one micro-lens (or micro-mirror) to another micro-lens (or micro-mirror) the shape of the micro-lenses (or micro-mirrors) is distorted. This distortion is caused at least in part by limitations of the manufacturing processes (moulding or extrusion) and the mould itself. In these areas, the optical performance may be degraded and the perforations do not strongly influence the optical performance of the screen. The shape of the perforations can be circular, ellipsoidal or polygonal, for example and without limitation. FIGS. 13A and 13B illustrate examples of screens with straight equidistant perforations at the corners between the micro-lenses or micro-mirrors (FIG. 13A) and perforations at the corners and at the edges between micro-lenses or micro-mirrors (FIG. 13B).

Figure 14A:
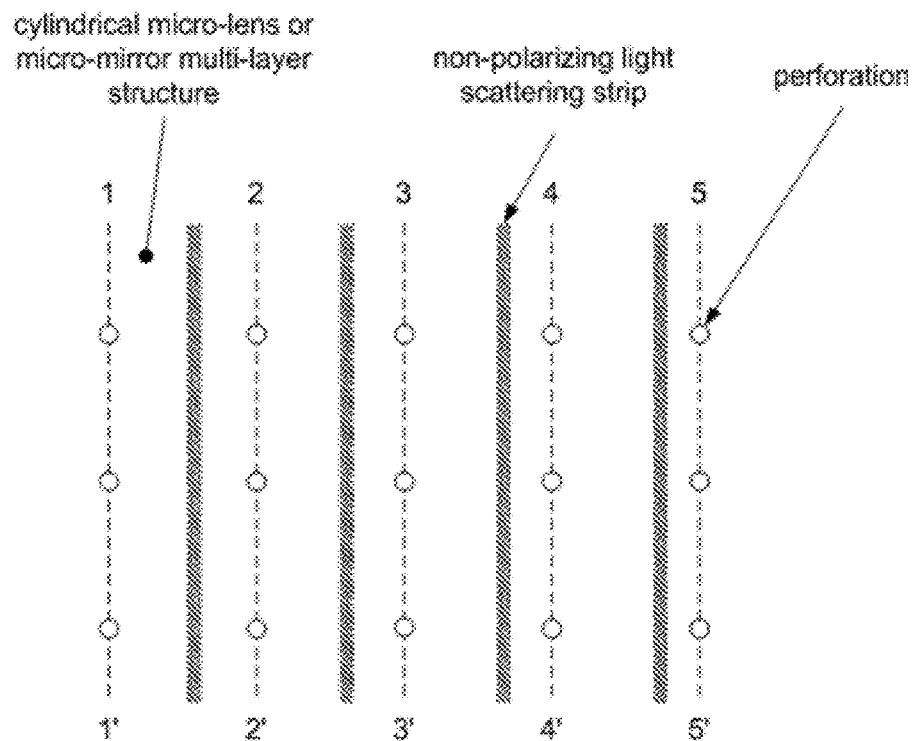
FIG. 14A illustrates an arrangement having straight equidistant circular perforations at the edges of cylindrical micro-lenses or micro-mirrors.
Figure 14B:
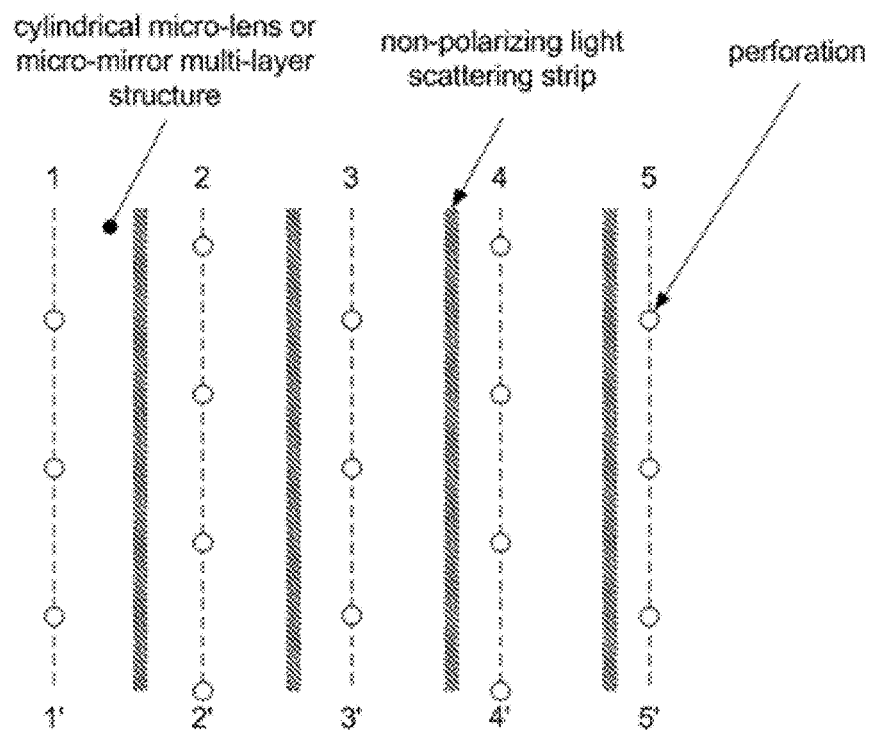
FIG. 14B illustrates an arrangement having staggered perforations at the edges between the cylindrical micro-lenses or micro-mirrors.

FIG. 14A illustrates an arrangement having straight equidistant circular perforations at the edges of cylindrical micro-lenses or micro-mirrors. FIG. 14B illustrates an arrangement having staggered perforations at the edges between the cylindrical micro-lenses or micro-mirrors.

CONCLUSION

The various features described above may be used independently of one another, or may be combined in various ways. All possible combinations and sub-combinations are intended to fall within the scope of this disclosure. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, is not generally intended to imply that features, elements and/or steps are required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present. The terms "about" or "approximate" and the like are synonymous and are used to indicate that the value modified by the term has an understood range associated with it, where the range can be ±20%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

While certain example embodiments have been described, these embodiments have been presented by way of example only, and are not intended to limit the scope of the inventions disclosed herein. Thus, nothing in the foregoing description is intended to imply that any particular feature or characteristic is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A screen for use in an immersive display system, the screen comprising:
    a multilayer structure comprising:
        an array of micro-lenses, individual lenses in the array of micro-lenses having a width D;
        a layer of light polarization material;
        a polarization rotation layer;
        a light reflection layer; and
        a section of non-polarizing light scattering material for individual micro-lenses in the array of micro-lenses;
    wherein the section of non-polarizing light scattering material has a width that is less than the width D,
    wherein, in use, light from a projector associated with the screen is substantially scattered by the non-polarizing light scattering material and light from a projector associated with a different screen in the immersive display system is substantially absorbed by the polarization layer.

2. The screen of claim 1, wherein the array of micro-lenses comprises spherical micro-lenses.

3. The screen of claim 2, wherein the array of micro-lenses further comprises aspherical micro-lenses.

4. The screen of claim 1, wherein the array of micro-lenses comprises cylindrical micro-lenses.

5. The screen of claim 4, wherein the array of micro-lenses further comprises cylindrical micro-lenses having an aspheric shape in a plane perpendicular to a longitudinal axis of the cylindrical micro-lens.

6. The screen of claim 4, wherein each section of non-polarizing light scattering material forms a strip parallel to a longitudinal axis of the associated cylindrical micro-lens.

7. The screen of claim 1 further comprising perforations positioned at transitions between micro-lenses in the array of micro-lenses.

8. The screen of claim 7, wherein the perforations in the array of perforations are located at corners between spherical micro-lenses.

9. The screen of claim 7, wherein the perforations in the array of perforations are located at edges between cylindrical micro-lenses.

10. The screen of claim 7, wherein the perforations in the array of perforations are equidistant along a straight line.

11. The screen of claim 7, wherein the perforations in the array of perforations are circular.

12. An immersive display system comprising one or more of the screens of claim 1.

13. The immersive display system of claim 12, wherein the one or more screens are curved.

14. A screen for use in an immersive display system, the screen comprising:
    a multilayer structure comprising:
        an array of micro-mirrors, individual mirrors in the array of micro-mirrors having a width D;
        a polarization rotation layer;
        a linear polarization layer; and
        a section of non-polarizing light scattering material for individual micro-mirrors in the array of micro-mirrors;
    wherein the section of non-polarizing light scattering material has a width that is less than the width D,
    wherein, in use, light from a projector associated with the screen is substantially scattered by the non-polarizing light scattering material and light from a projector associated with a different screen in the immersive display system is substantially absorbed by the polarization layer.

15. The screen of claim 14, wherein the array of micro-mirrors comprises spherical micro-mirrors.

16. The screen of claim 15, wherein the array of micro-mirrors further comprises aspherical micro-mirrors.

17. The screen of claim 14, wherein the array of micro-mirrors comprises cylindrical micro-mirrors.

18. The screen of claim 17, wherein each section of non-polarizing light scattering material forms a strip parallel to a longitudinal axis of the associated cylindrical micro-mirror.

19. The screen of claim 14 further comprising perforations positioned at transitions between micro-mirrors in the array of micro-mirrors.

20. An immersive display system comprising one or more of the screens of claim 14.

\* \* \* \* \*